US012683824B2

(12) United States Patent
Gopal et al.

(10) Patent No.: US 12,683,824 B2
(45) Date of Patent: Jul. 14, 2026

(54) METHOD AND APPARATUS FOR CREATING AN ONLINE CLASSROOM COMMUNITY TO FACILATE USER PARTICIPATION

(71) Applicant: Campusknot Inc., Starkville, MS (US)

(72) Inventors: Rahul Gopal, Starkville, MS (US); Huey Ngo, Brandon, MS (US); Perceus Mody, Nashville, TN (US); Hiten Patel, Starkville, MS (US)

(73) Assignee: CAMPUSKNOT INC., Starkville, MS (US)

( * ) Notice: Subject to any disclaimer, the term of this patent is extended or adjusted under 35 U.S.C. 154(b) by 0 days.

(21) Appl. No.: 18/122,522

(22) Filed: Mar. 16, 2023

(65) Prior Publication Data

US 2023/0327896 A1     Oct. 12, 2023

Related U.S. Application Data

(60) Provisional application No. 63/320,479, filed on Mar. 16, 2022.

(51) Int. Cl.
*H04L 12/18* (2006.01)
*H04L 9/40* (2022.01)

(52) U.S. Cl.
CPC ...... *H04L 12/1831* (2013.01); *H04L 12/1822* (2013.01); *H04L 63/067* (2013.01)

(58) Field of Classification Search
CPC ........................ H04L 12/1831; H04L 12/1822
See application file for complete search history.

(56) References Cited

U.S. PATENT DOCUMENTS

| 7,472,823 B1 * | 1/2009 | Guggenheim, Jr. ... | G06Q 30/02 |
| | | | 235/382 |
| 10,126,927 B1 * | 11/2018 | Fieldman .............. | G06F 3/1454 |
| 10,467,918 B1 * | 11/2019 | Fieldman ................ | G09B 5/10 |
| 10,540,906 B1 * | 1/2020 | Fieldman ............ | H04L 12/1822 |
| 2011/0125844 A1 * | 5/2011 | Collier .................... | H04W 4/38 |
| | | | 709/204 |
| 2015/0058103 A1 * | 2/2015 | Kirk ................... | G06Q 30/0214 |
| | | | 705/14.16 |
| 2015/0294274 A1 * | 10/2015 | Williams ........... | G06Q 10/1095 |
| | | | 705/7.19 |
| 2016/0073054 A1 * | 3/2016 | Balasaygun ........ | H04L 12/1813 |
| | | | 348/14.08 |
| 2016/0364819 A1 * | 12/2016 | Salimi ................... | H04W 4/021 |

(Continued)

*Primary Examiner* — Jonathan A Bui
(74) *Attorney, Agent, or Firm* — DITTHAVONG, STEINER & MLOTKOWSKI

(57) ABSTRACT

An approach for enhancing class participation is disclosed. The approach comprises establishing a classroom user group including an instructor user and one or more student users. The approach further comprises providing a feed to the one or more student users, wherein the feed relates to a subject designated for the classroom user group. The approach further comprises monitoring for feedback information by each of the one or more student users in response to the feed. The approach also comprises attributing a participation credit to corresponding one or more of the student users based on the feedback information. The approach further comprises generating a participation score for each of the one or more students according to the attributed participation credit.

20 Claims, 34 Drawing Sheets

(56)          References Cited

U.S. PATENT DOCUMENTS

2019/0087923 A1*   3/2019   Gough ..................... G07C 1/10
2019/0279522 A1*   9/2019   Jafari ....................... G09B 5/08
2023/0140607 A1*   5/2023   Agrawal .............. H04L 65/403
                                                   709/204

* cited by examiner

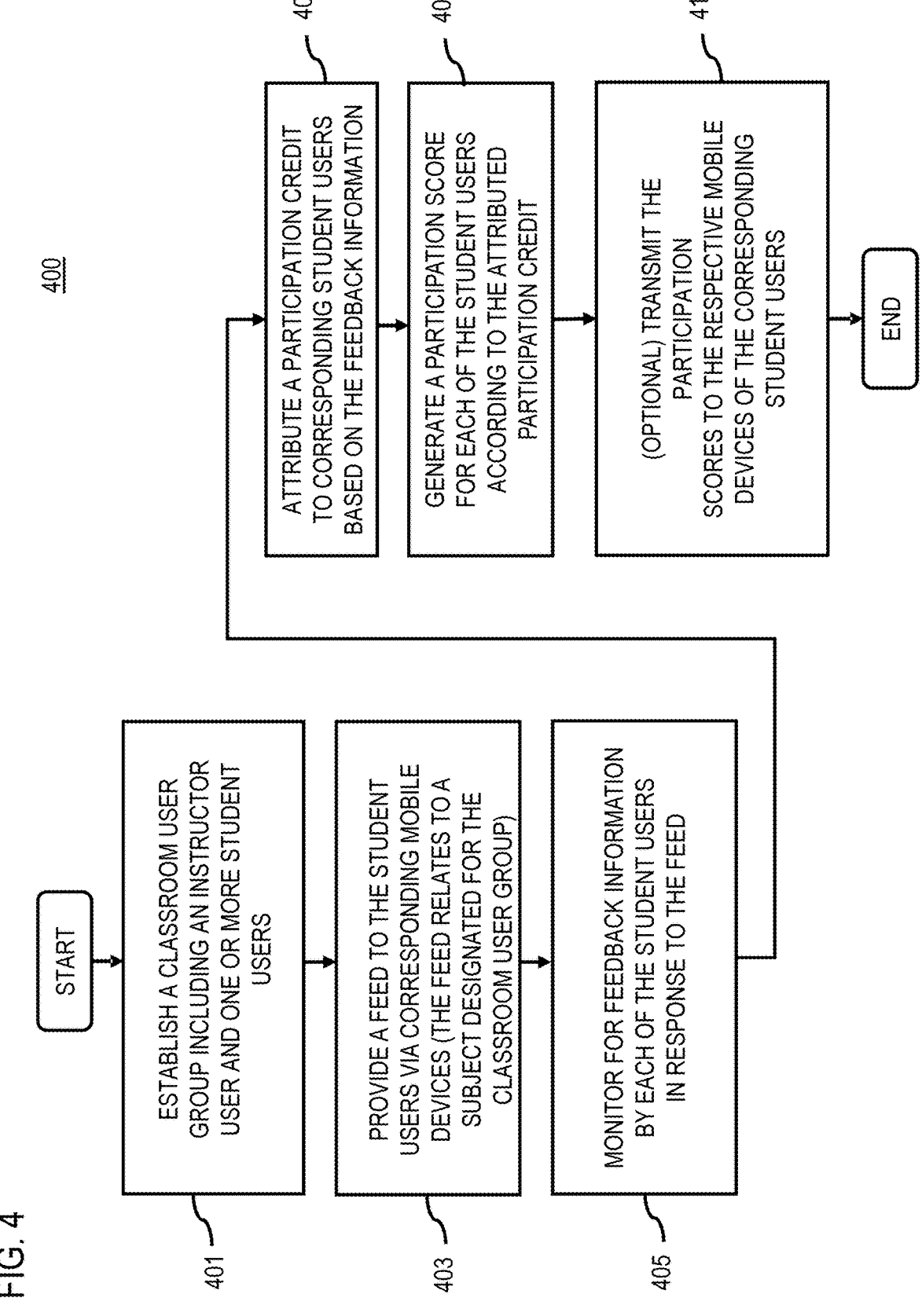

START

401 — ESTABLISH A CLASSROOM USER GROUP INCLUDING AN INSTRUCTOR USER AND ONE OR MORE STUDENT USERS

403 — PROVIDE A FEED TO THE STUDENT USERS VIA CORRESPONDING MOBILE DEVICES (THE FEED RELATES TO A SUBJECT DESIGNATED FOR THE CLASSROOM USER GROUP)

405 — MONITOR FOR FEEDBACK INFORMATION BY EACH OF THE STUDENT USERS IN RESPONSE TO THE FEED

407 — ATTRIBUTE A PARTICIPATION CREDIT TO CORRESPONDING STUDENT USERS BASED ON THE FEEDBACK INFORMATION

409 — GENERATE A PARTICIPATION SCORE FOR EACH OF THE STUDENT USERS ACCORDING TO THE ATTRIBUTED PARTICIPATION CREDIT

411 — (OPTIONAL) TRANSMIT THE PARTICIPATION SCORES TO THE RESPECTIVE MOBILE DEVICES OF THE CORRESPONDING STUDENT USERS

END

User roles 500

Member

Join Group
Interact with
content (when
allowed)
Share content

Admin

Create Groups
Add Members
Set permissions
Add graded and
non graded
content

Invite via CSV

600

Invite via Group Code

Figure 6E:
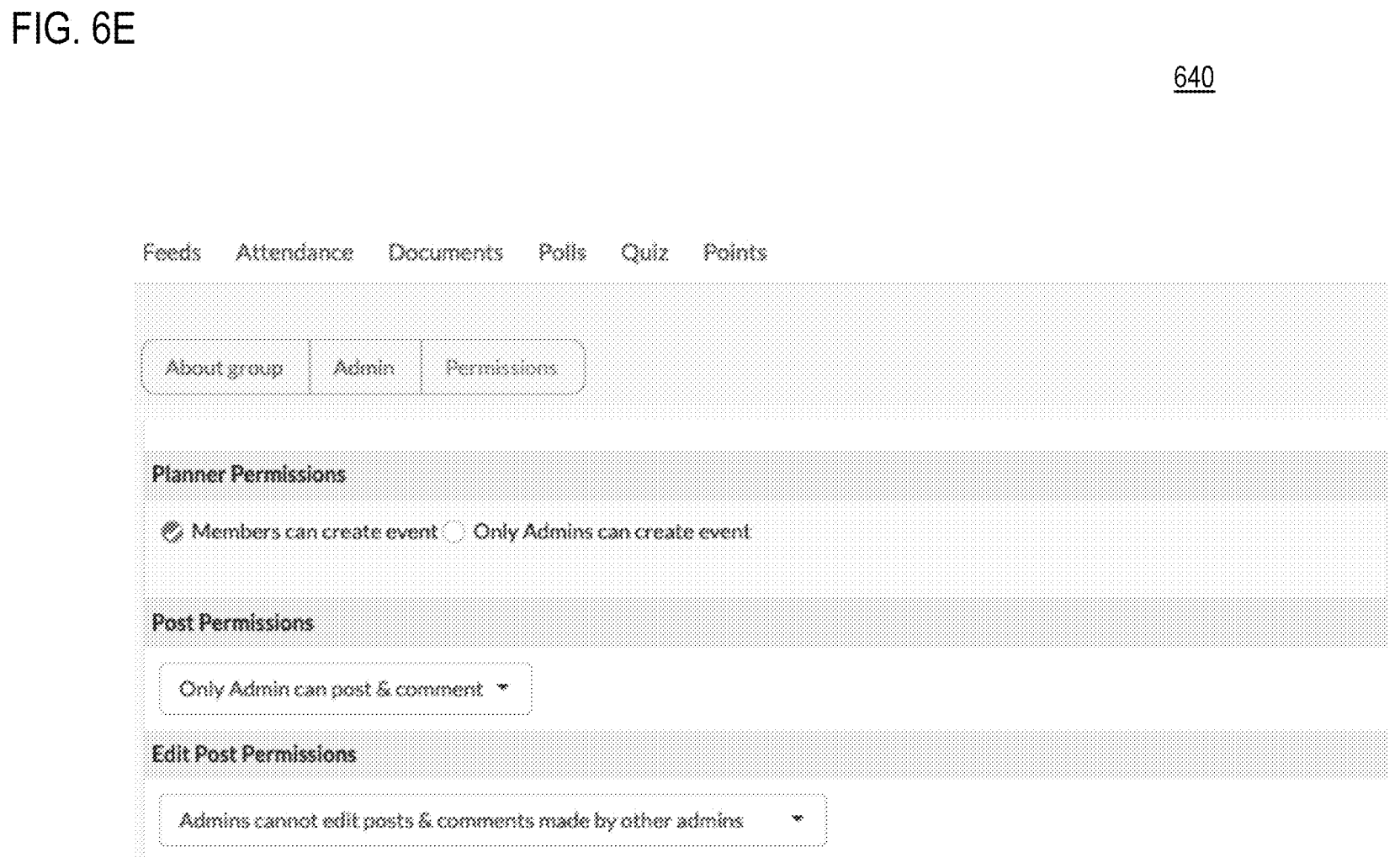

Feeds   Attendance   Documents   Polls   Quiz   Points

About group | Admin | Permissions

Planner Permissions

◉ Members can create event ○ Only Admins can create event

Post Permissions

Only Admin can post & comment   ▾

Edit Post Permissions

Admins cannot edit posts & comments made by other admins   ▾

700

810

910

START: 02 Nov 2019, 04:29 PM | END: 03 Nov 2019, 08:29 PM
[Time's up!]

What is the term for finite series of equal payments that occur at regular intervals?

A   Annuity

B   Ordinary Annuity

C   Annuity Due

Figure 10A:
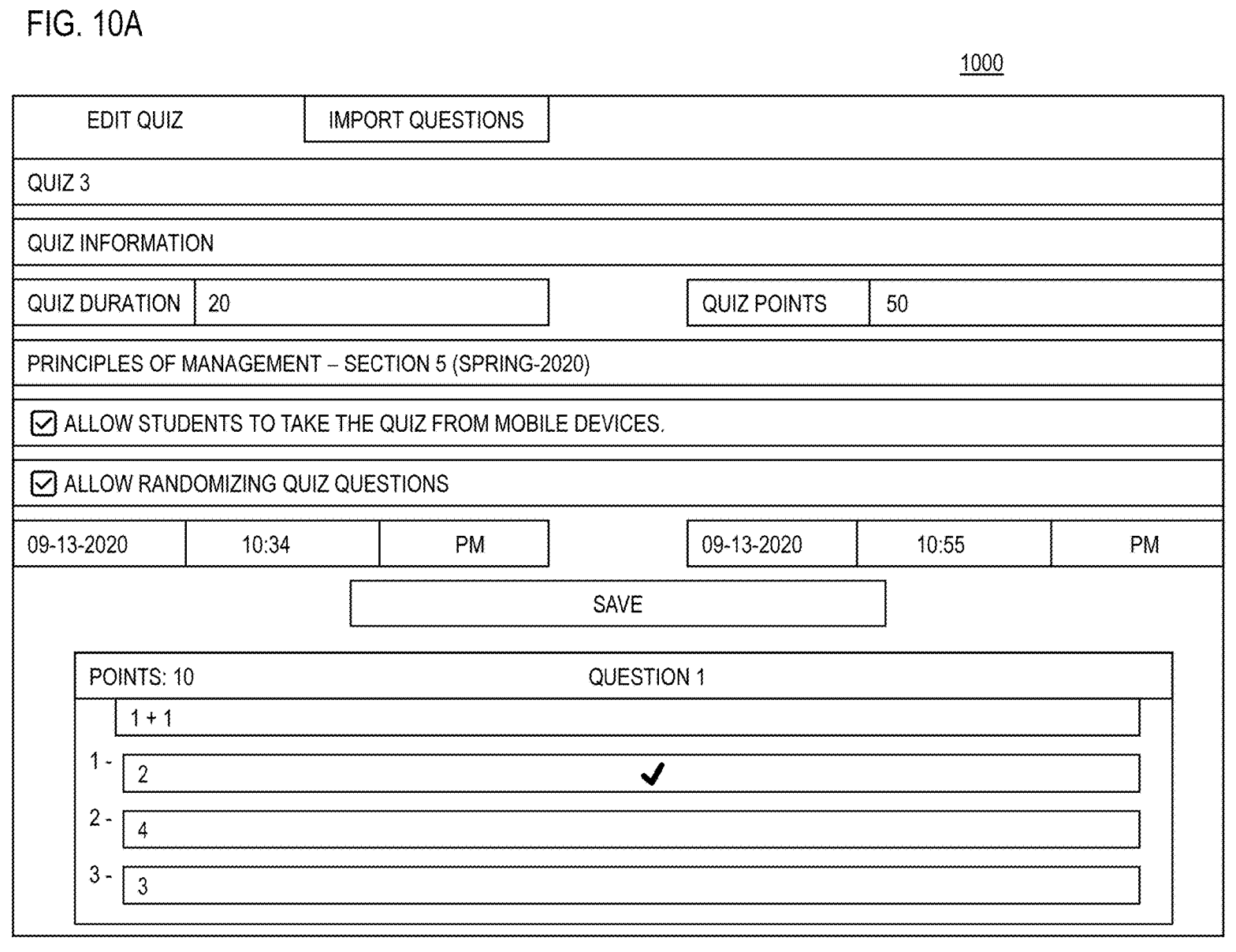

EDIT QUIZ     IMPORT QUESTIONS

QUIZ 3

QUIZ INFORMATION

QUIZ DURATION   20     QUIZ POINTS   50

PRINCIPLES OF MANAGEMENT – SECTION 5 (SPRING-2020)

☑ ALLOW STUDENTS TO TAKE THE QUIZ FROM MOBILE DEVICES.

☑ ALLOW RANDOMIZING QUIZ QUESTIONS 09-13-2020   10:34   PM     09-13-2020   10:55   PM

SAVE

QUESTION 1

POINTS: 10

Figure 10B:
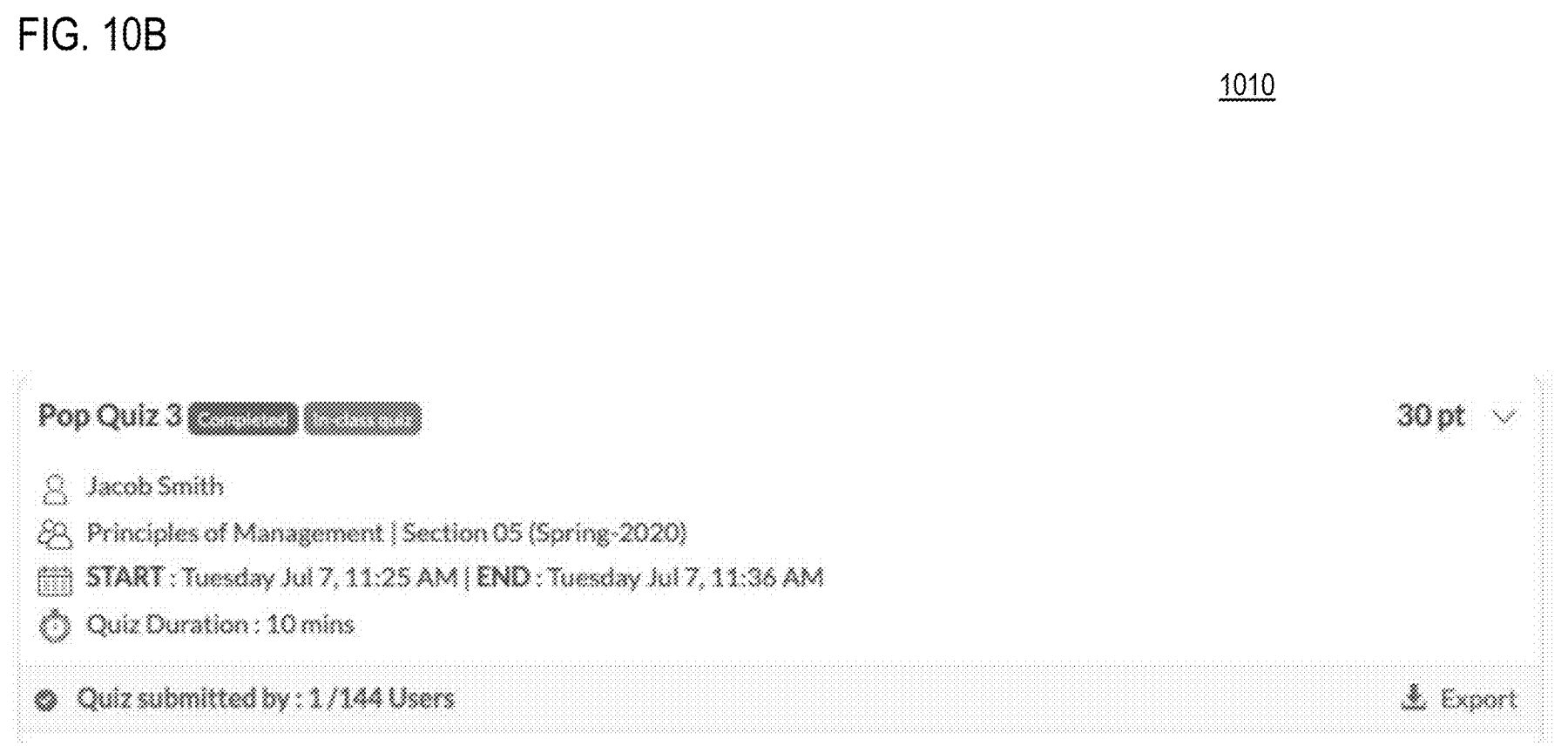

Pop Quiz 3

Jacob Smith

Principles of Management | Section 05 (Spring-2020)

START : Tuesday Jul 7, 11:25 AM | END : Tuesday Jul 7, 11:36 AM

Quiz Duration : 10 mins

Quiz submitted by : 1 / 144 Users

Export

In-class poll

Select Lecture Date    08-05-2021

☑ Lecture : 04:09:08 PM

☐ Lecture : 04:18:29 PM

Take new attendance

Next ∨

Figure 11D:
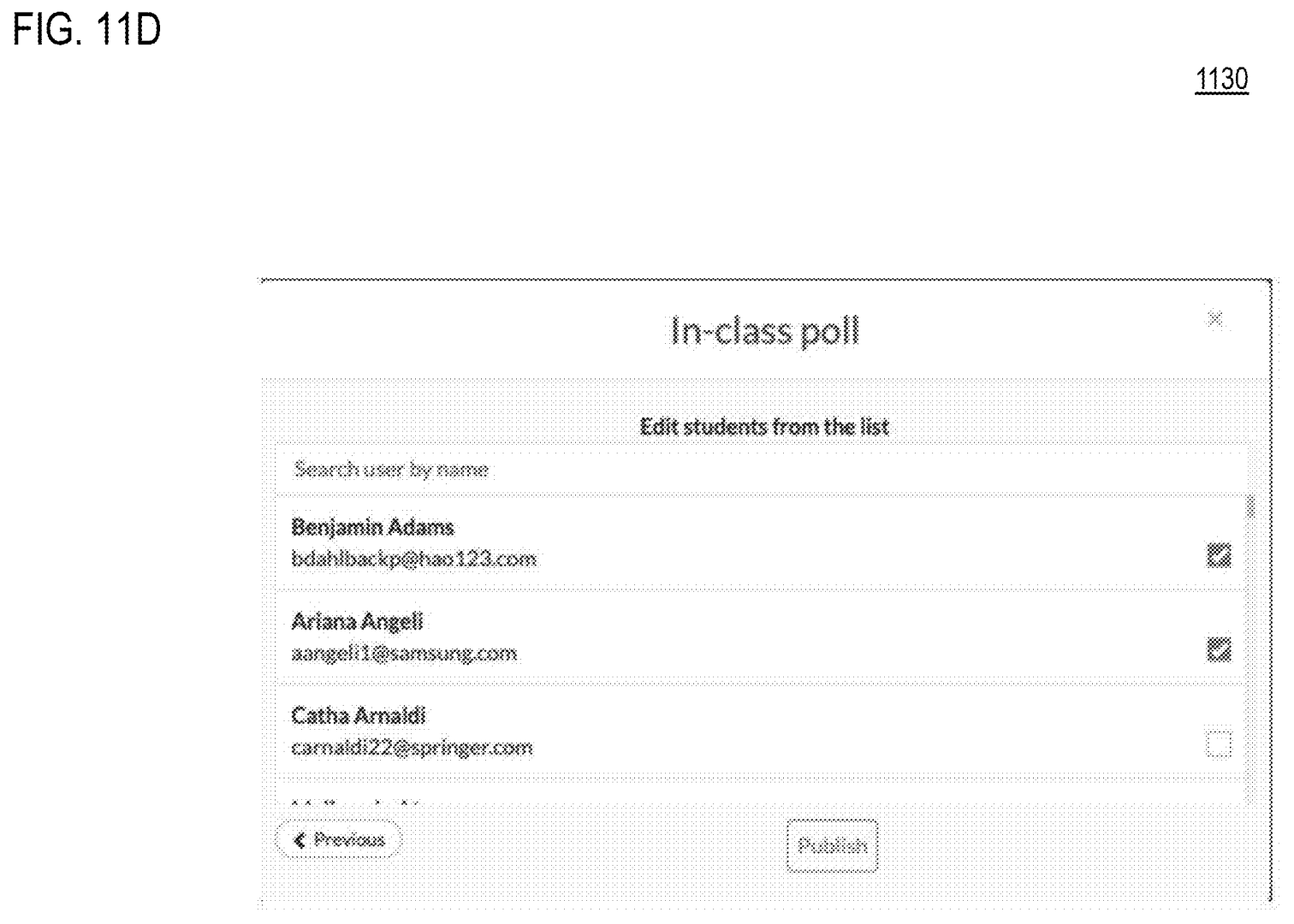

In-class poll

Edit students from the list

Search user by name

Benjamin Adams
bdahlbackphao122.com

Ariana Angeli
angeli1@samsung.com

Catha Arnaldi
carnaldi22@springer.com

Previous

Publish

August 10, 2021
(CDT timezone)

01:00 pm - 01:10 pm

01:10 pm - 01:20 pm

01:20 pm - 01:30 pm

August 2021

Figure 14:
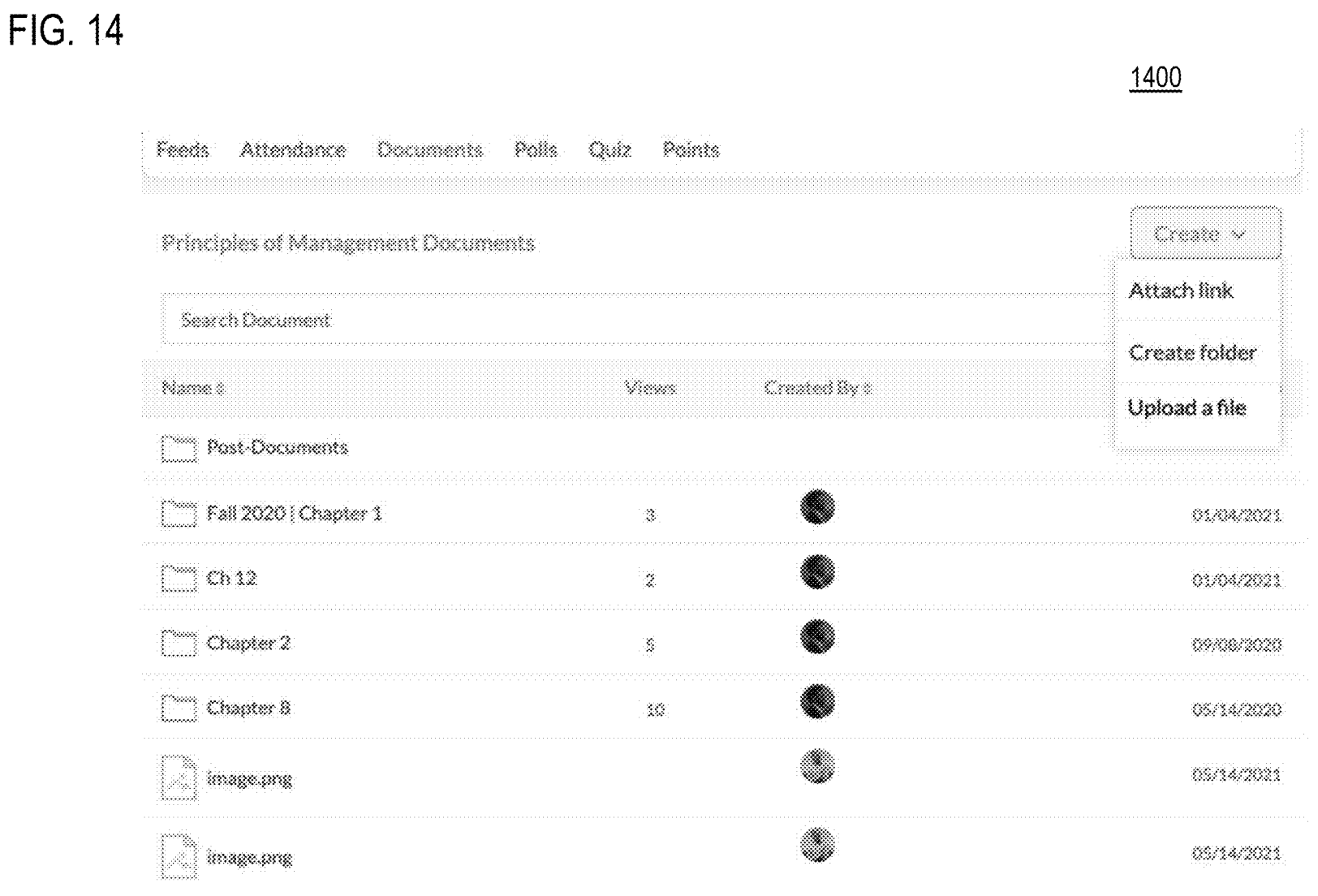

Feeds    Attendance    Documents    Polls    Quiz    Points

Principles of Management Documents

Create ∨

Attach link

Create folder

Upload a file

Search Document

| Name ≑ | Views | Created By | |
|---|---|---|---|
| ☐ Past-Documents | | | |
| ☐ Fall 2020 \| Chapter 1 | 3 | ● | 03/06/2021 |
| ☐ Ch 12 | 2 | ● | 03/04/2021 |
| ☐ Chapter 2 | 5 | ● | 09/09/2020 |
| ☐ Chapter 8 | 10 | ● | 05/16/2020 |
| ☐ image.png | | ● | 05/14/2021 |
| ☐ image.png | | ● | 05/14/2021 |

Figure 16:
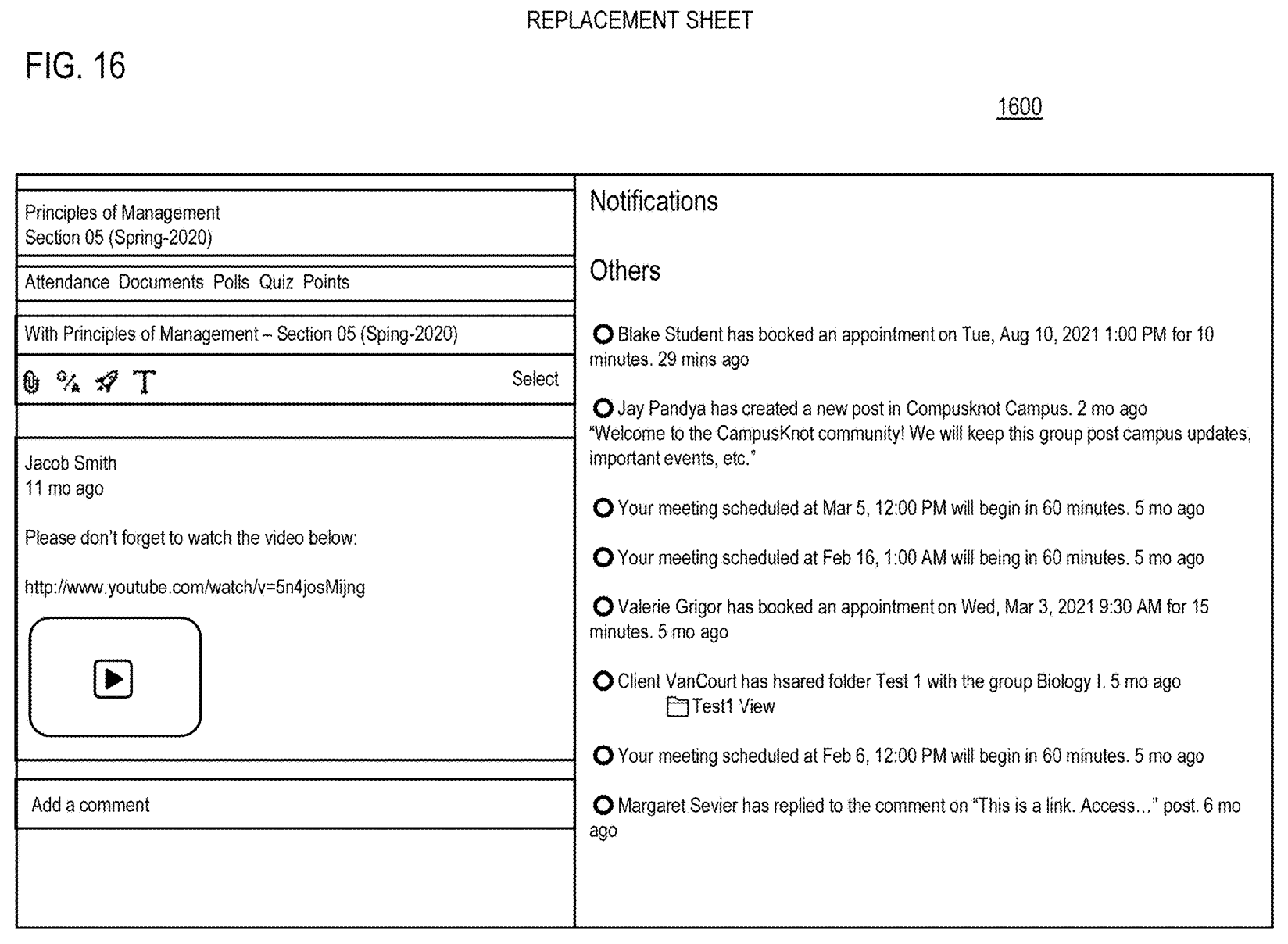

REPLACEMENT SHEET

Principles of Management
Section 05 (Spring-2020)

Attendance  Documents  Polls  Quiz  Points

With Principles of Management – Section 05 (Sping-2020)

😡  %  ✐  T                                                    Select

Jacob Smith
11 mo ago

Please don't forget to watch the video below:

http://www.youtube.com/watch/v=5n4josMijng

[▲]

Add a comment

Notifications

Others

◯ Blake Student has booked an appointment on Tue, Aug 10, 2021 1:00 PM for 10 minutes. 29 mins ago ◯ Jay Pandya has created a new post in Compusknot Campus. 2 mo ago
"Welcome to the CampusKnot community! We will keep this group post campus updates, important events, etc."

◯ Your meeting scheduled at Mar 5, 12:00 PM will begin in 60 minutes. 5 mo ago

◯ Your meeting scheduled at Feb 16, 1:00 AM will being in 60 minutes. 5 mo ago

◯ Valerie Grigor has booked an appointment on Wed, Mar 3, 2021 9:30 AM for 15 minutes. 5 mo ago ◯ Client VanCourt has hsared folder Test 1 with the group Biology I. 5 mo ago
☐ Test1 View ◯ Your meeting scheduled at Feb 6, 12:00 PM will begin in 60 minutes. 5 mo ago ◯ Margaret Sevier has replied to the comment on "This is a link. Access...." post. 6 mo ago

FIG. 17

METHOD AND APPARATUS FOR CREATING AN ONLINE CLASSROOM COMMUNITY TO FACILATE USER PARTICIPATION

RELATED APPLICATION

This application claims priority of U.S. Provisional Patent Application Ser. No. 63/320,479, entitled "METHOD AND APPARATUS FOR CREATING AN ONLINE CLASSROOM COMMUNITY TO FACILITATE USER PARTICIPATION," filed on Mar. 16, 2022, the contents of which are hereby incorporated herein in their entirety by this reference.

BACKGROUND

Motivating students to engage in class participation continues to be a challenge for instructors at all educational levels. Part of the pedagogical methodology involves imparting knowledge of students to other students as well as providing feedback to the instructor relating to progress or understanding of a topic. Traditionally, in person classroom instructions require students to actively raise their hands and ask questions or contribute to the discussion at hand; under this scenario, the instructor may make a manual note that the student has participated in this one instance. With the popularity of hybrid classroom settings (in which the student may be in a virtual classroom), tracking participation has become an even more onerous process. Additionally, conventional online tools do not account for other means of communications (i.e., participation) by the students. For example, a student may raise a question or otherwise participate in form of an email, an instant message, a post, etc.

SOME EXAMPLE EMBODIMENTS

Therefore, there is a need for an approach that accurately tracks a student's participation in a virtual classroom while accounting for the varied forms of online communications available.

According to one embodiment, a method comprises establishing a classroom user group including an instructor user and one or more student users. The method further comprises providing a feed to the one or more student users, wherein the feed relates to a subject designated for the classroom user group. The method further comprises monitoring for feedback information by each of the one or more student users in response to the feed. The method also comprises attributing a participation credit to corresponding one or more of the student users based on the feedback information. The method further comprises generating a participation score for each of the one or more students according to the attributed participation credit.

According to another embodiment, an apparatus comprises at least one processor, and at least one memory including computer program code for one or more computer programs, the at least one memory and the computer program code configured to, with the at least one processor, cause, at least in part, the apparatus to establish a classroom user group including an instructor user and one or more student users. The apparatus is also caused to provide a feed to the one or more student users, wherein the feed relates to a subject designated for the classroom user group. The apparatus is further caused to monitor for feedback information by each of the one or more student users in response to the feed, and to attribute a participation credit to corresponding one or more of the student users based on the feedback information. The apparatus is also caused to generate a participation score for each of the one or more students according to the attributed participation credit.

According to another embodiment, a non-transitory computer-readable storage medium carries one or more sequences of one or more instructions which, when executed by one or more processors, cause, at least in part, an apparatus to establish a classroom user group including an instructor user and one or more student users. The apparatus is also caused to provide a feed to the one or more student users, wherein the feed relates to a subject designated for the classroom user group. The apparatus is further caused to monitor for feedback information by each of the one or more student users in response to the feed, and to attribute a participation credit to corresponding one or more of the student users based on the feedback information. The apparatus is also caused to generate a participation score for each of the one or more students according to the attributed participation credit.

According to another embodiment, an apparatus comprises means for establishing a classroom user group including an instructor user and one or more student users. The apparatus also comprises providing a feed to the one or more student users, wherein the feed relates to a subject designated for the classroom user group. The apparatus also comprises means for monitoring for feedback information by each of the one or more student users in response to the feed. The apparatus also comprises means attributing a participation credit to corresponding one or more of the student users based on the feedback information. The apparatus also comprises means for generating a participation score for each of the one or more students according to the attributed participation credit.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between the service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 4 is a flowchart of a process for facilitating participation and generating a participation score, according to one embodiment;

FIGS. 6A-6F are correspondingly flowcharts of the grouping function, and associated graphical user interface (GUI), according to various example embodiments;

FIGS. 9A-9C are diagrams of a GUI for polling of student users engaged in a participation feed, according to various example embodiments;

FIGS. 10A and 10B are diagrams of a GUI involved with providing a quiz to student users, according to various example embodiments;

Figure 11C:
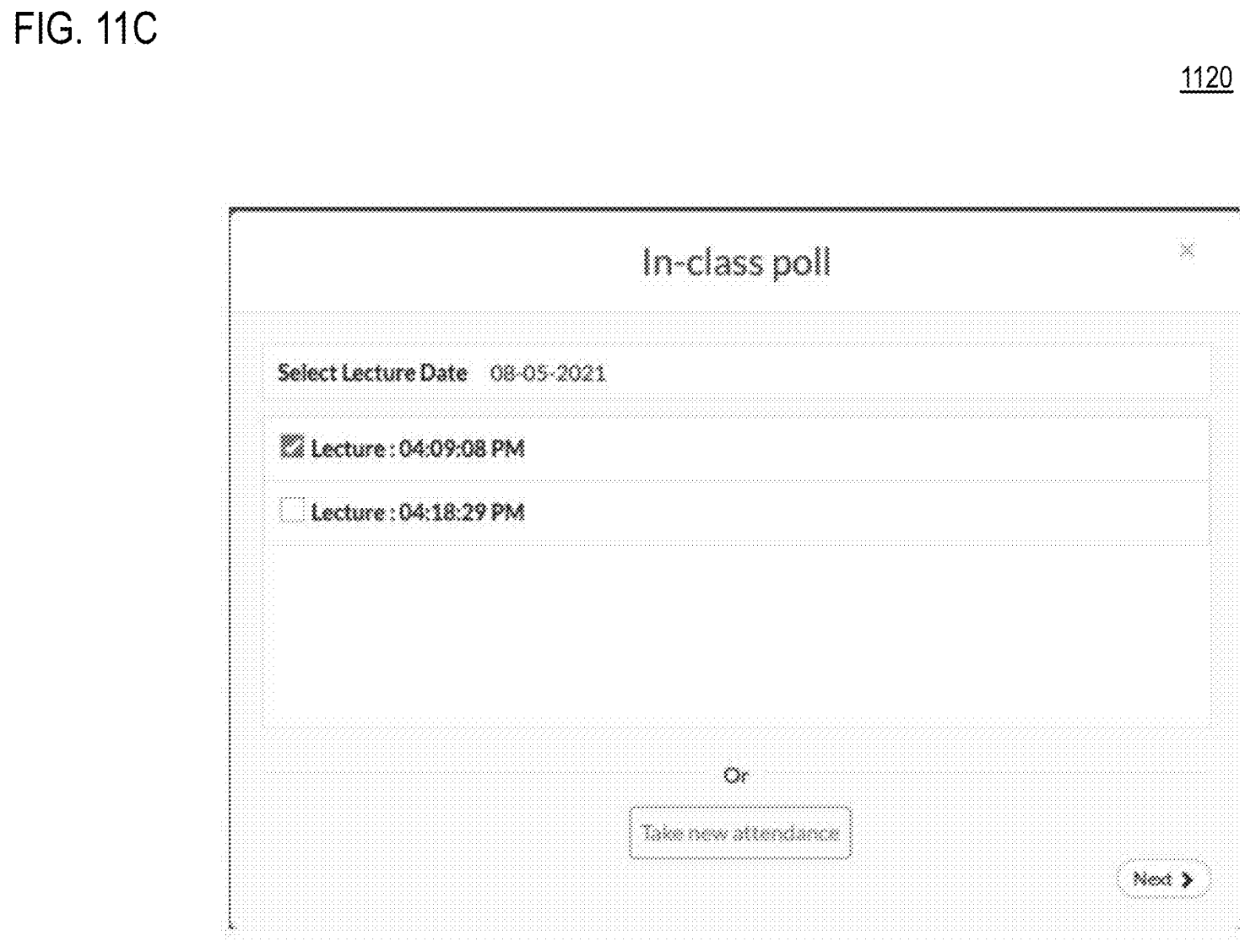

FIGS. 11A-11D are a flowchart of a process for providing an in-class feature, and associated diagrams of the associated GUI, according to various example embodiments;

FIGS. 12A-12C are diagrams of a GUI for scheduling office hours with an instructor user, according to various example embodiments;

FIG. 14 is a diagram of a GUI for uploading media used in the system of FIG. 1, according to various example embodiments;

FIG. 16 is a diagram of a GUI for generating notifications to track degree of participation by the student users, according to various example embodiments;

FIG. 17 is a diagram of a GUI for managing user accounts, according to various example embodiments;

DESCRIPTION OF SOME EMBODIMENTS

Examples of a method, apparatus, and computer program for enhancing class participation are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
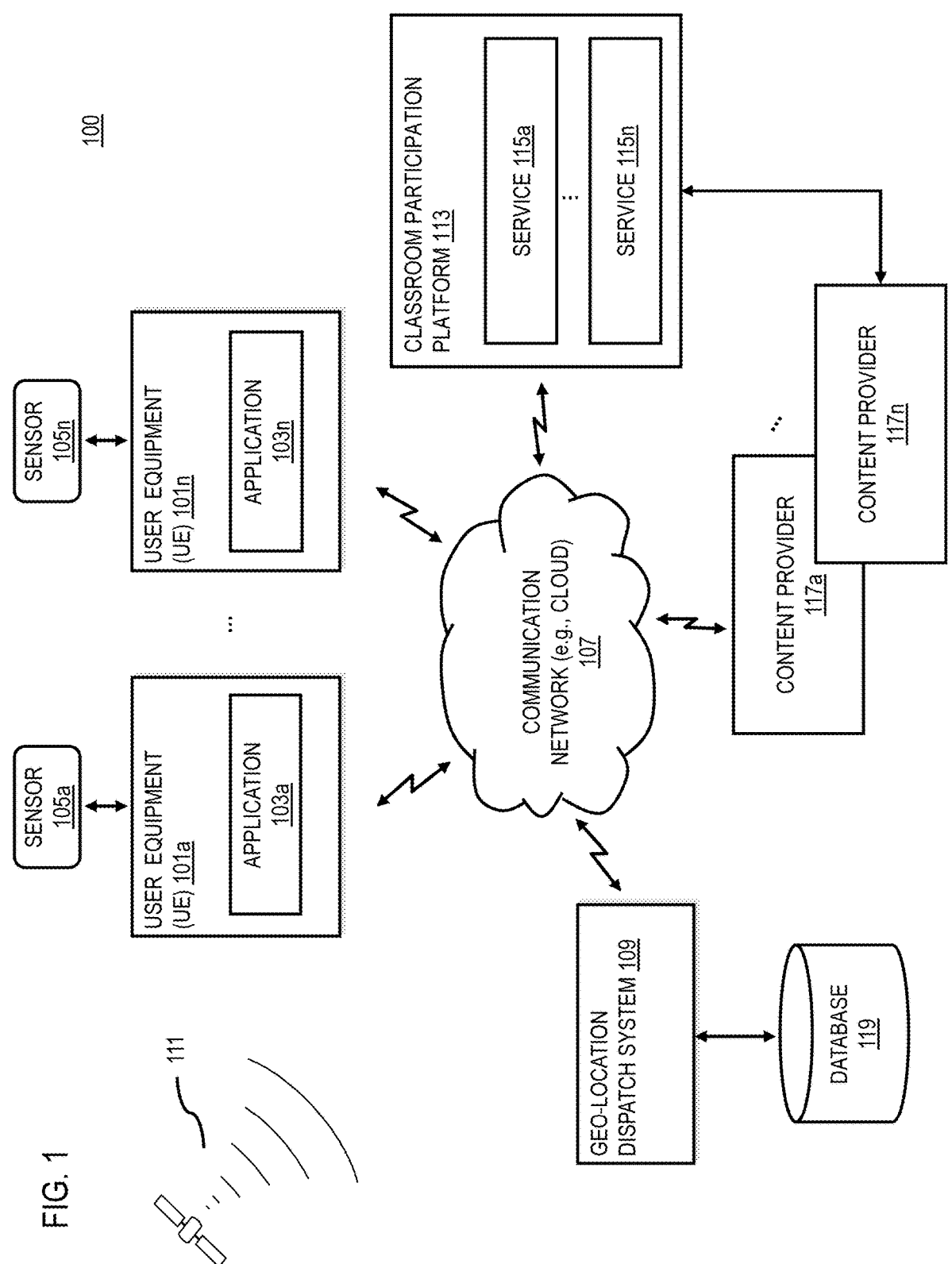
FIG. 1 is a diagram of classroom participation platform, according to one embodiment.

FIG. 1 is a diagram of classroom participation platform, according to one embodiment. Although the use cases described herein relate to educational communities and two types of users, it is contemplated that the processes and mechanisms of tracking feedback can be deployed to a multitude of user types and other communities (or groups) with other goals (e.g., entertainment, public service, etc.).

To address the noted drawbacks of conventional systems and approaches to encouraging and tracking user participation, a system 100 of FIG. 1 includes a classroom participation platform that introduces the capability to accurately track and promote activities or events in an instructional setting (which can be virtual or hybrid (including in-person) classrooms). As shown in FIG. 1, the system 100 also comprises user equipment (UE) 101a-101n (collectively referred to as UE 101) that may include or be associated with applications 103a-103n (collectively referred to as applications 103) and sensors 105a-105n (collectively referred to as sensors 105). The sensors 105, in one embodiment, is a camera that captures images and/or video. In one embodiment, the UE 101 has connectivity to the classroom participation platform 109 via the communication network 107. The classroom participation platform 109 performs one or more functions associated with tracking participation, receiving student feedback information (e.g., participation activities and content), and generating participation scores in conjunction with the UEs 101a-101n.

The platform 109 allow users (e.g., students) in an educational setting to exchange information, ideas, opinions, feedback with one another, etc.; thereby advantageously enhancing greater learner participation and interaction with course material and the instructor.

According to one embodiment, the platform 109 provides features designed to enable discussion, communication, assessment, and feedback all within a centralized system (e.g., website) and mobile platform. Conventional classroom tools consist of either a singular assessment feature (e.g., a quiz or test taking mechanism) or a loose assortment of multiple assessment tools (e.g., a learning management system). By contrast, the platform 109 supports a holistic approach to learning, which involves information dissemination, analysis, retention, and exchange that is dynamic and multi-faceted. The platform 109 is unbounded by hierarchies (i.e., roles within a learning setting), possessing the ability to both share and consume information.

As noted, the platform 109 supports a web and mobile application that offers a scalable discussion medium (e.g., a feed), in which information can be exchanged between any individuals or groups of individuals via a suite of collaboration and assessment tools that support learning. This centralization and flexibility remove the barriers that keep students from contributing to a learning environment and also assists them in learning from one another.

Moreover, the platform 109 can support unlimited groups of learners and instructors, offering the ability to organize and direct teaching and learning activities based on any number of criteria. As a result, participation is induced by both removing the barriers to engaging in discussion and feedback, while also allowing any number of ideas and groups to form around the goal of learning. The platform 109 thus can accommodate a small group of participants in a critical analysis class, for example, or an entire organization of thousands of users engaged in sharing ideas and announcements.

By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, a smartphone, a smartwatch, smart eyewear, or any combination thereof, including the accessories and peripherals of these devices, or any combination thereof. It is also contemplated that the UE 101 can support any type of interface to the user (such as "wearable" circuitry, etc.). In one embodiment, the UE 101 may include Global Positioning System (GPS) receivers to obtain geographic coordinates from satellites 111 for determining current location and time associated with the UE 101; such GPS information can be utilized to geo-tag images captured by the sensors.

The classroom participation platform 109 operates in conjunction with one or more applications resident on an UE 101. By way of example, the applications 103 may be any type of application that is executable at UE 101, such as content provisioning services, camera/imaging application, media player applications, social networking applications, calendar applications, and the like. In one embodiment, the applications 103 may assist in conveying sensor information via the communication network 107. In another embodiment, one of the applications 103 at the UE 101 may act as a client for the classroom participation platform 109 and perform one or more functions associated with the functions of the platform 109 by interacting with the platform 109 over the communication network 107.

The communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short-range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including 5G (5th Generation), 4G, 3G, 2G, Long Term Evolution (LTE), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In one embodiment, the classroom participation platform 109 may be a platform with multiple interconnected components. The classroom participation platform 109 may include multiple servers, intelligent networking devices, computing devices, components and corresponding software for providing real-time feedback based, at least in part, on analysis of sensor information. In addition, it is noted that the classroom participation platform 109 may be integrated or separated from services platform 113. Also, certain functionalities of the system 109 may reside within the UE 101 (e.g., as part of the applications 103).

As shown in FIG. 1, the system 109 can interface a services platform 113, which provides various services, such as notification services, content (e.g., audio, video, images, etc.) provisioning services, application services, storage services, contextual information determination services, social networking services, location-based services, information-based services, etc. In one embodiment, the services platform 113 may interact with the UE 101, the classroom participation platform 109 and the content provider 117 to supplement or aid in the processing of the content information.

In the embodiment of FIG. 1, content providers 117a-117n (collectively referred to as content provider 117) may provide content to the UE 101, the classroom participation platform 109, and the services 115 of the services platform 113. The content provided may be any type of content, such as image content (e.g., pictures), textual content, audio content, video content, etc. In one embodiment, the content provider 117 may provide content that may supplement the content of the applications 103, the sensors 105, or a combination thereof. In another embodiment, the content provider 117 may also store content associated with the UE 101, the classroom participation platform 109, and the services 115 of the services platform 113. In a further embodiment, the content provider 117 may manage access to a central repository of data and offer a consistent, standard interface to data.

Associated with the classroom participation platform 109 is database 119. It is contemplated that database 119 can be implemented as a cloud storage system. In one embodiment, the database 119 stores sensor data as well as user/subscriber profile information.

By way of example, UE 101, the classroom participation platform 109, the services platform 113, and the content provider 117 communicate with each other and other components of the communication network 107 using well known, new or still developing protocols (e.g., IoT standards and protocols). In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
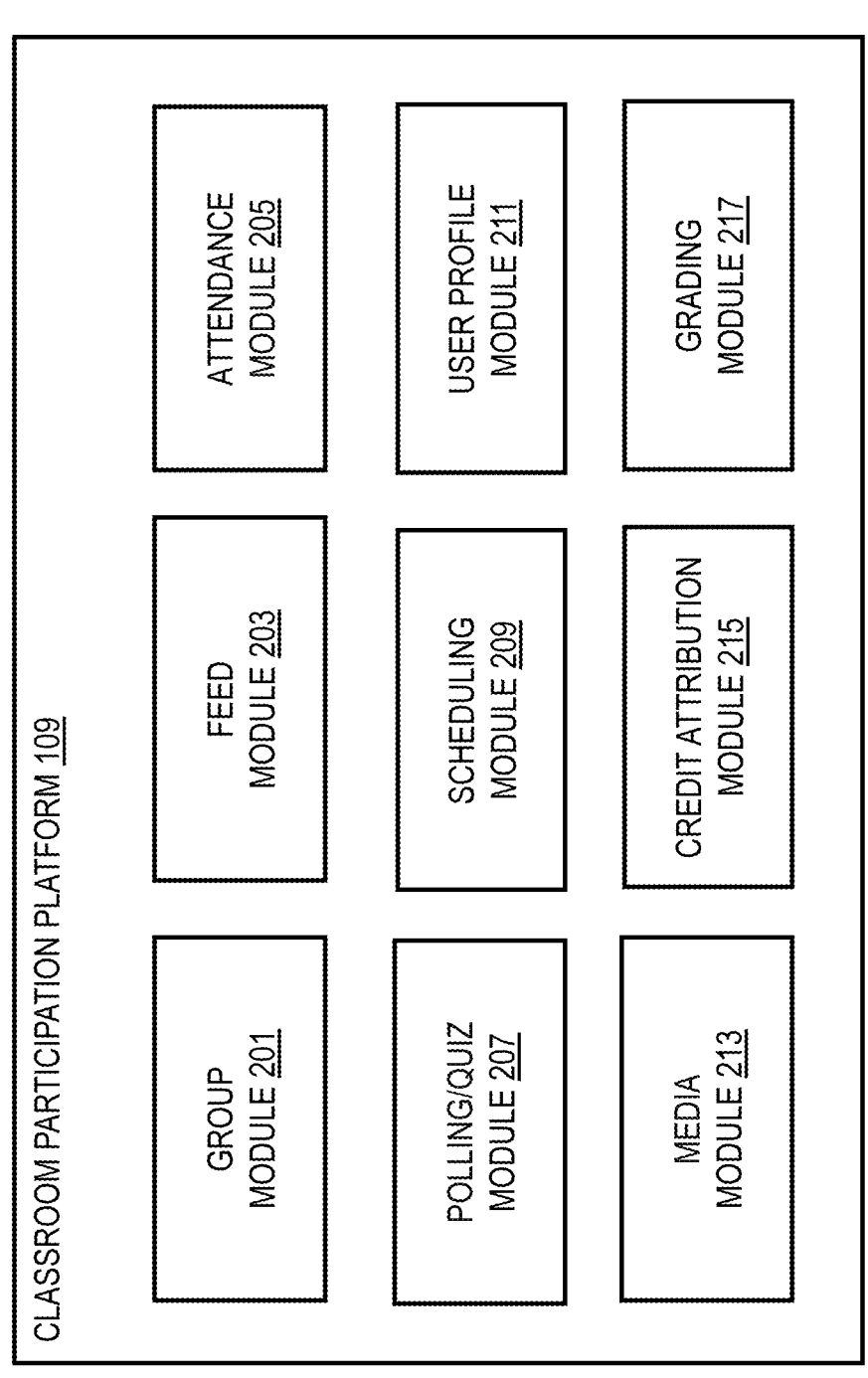
FIG. 2 is a diagram of the components of the classroom participation platform of FIG. 1, according to one embodiment.

FIG. 2 is a diagram of the components of the classroom participation platform of FIG. 1, according to one embodiment. By way of example, the platform 109 includes one or more components for providing participation in a learning environment that can be in-person, virtual, or both. It is contemplated that the functions of these components may be combined in one or more components or performed by other components of equivalent functionality. In this embodiment, the classroom participation platform 109 includes the following modules: a group module 201, a feed module 203, an attendance module 205, a polling/quiz module 207, a scheduling module 209, a user profile module 211, a media module 213, a credit attribution module 215, and a grading module 217. The group module 201 defines the various types of users according to their roles and/or functions. For example, module 201 can define two groups of users: one with administrative capabilities and one as simply a member. As an administrative user (e.g., instructor user), the user is provided with the following functions: creation of groups, addition or deletion of members of the group, configure permissions, specify whether certain content is to be graded or non-graded materials, etc. As a member (e.g., student user), this user can perform the following functions: join a group, interact with content specified by other members or the instructor user (e.g., according to their permission level), share content with other members within the group and/or the instructor user, etc. The feed module 203 supplies, according to one embodiment, a social media style wall feed to permit users to post content. The attendance module 205 tracks the attendance of online users; such attendance record can then be factored into class participation grades. The polling/quiz (or test) module 207 provides the instructor user with the ability to create a mechanism to test the students' knowledge of the course material dynamically—e.g., to coincide with the subject matter of the present feed. The scheduling module 209 permits the student user to schedule office hours with the instructor user seamlessly. The user profile module 211 enables a particular user to specify various account settings and user information.

The media module 213 permits users to upload various media, including documents to be part of the feed. In addition, the platform 109 utilizes the credit attribution module 215 to give points (i.e., assign credits) to users who participate in graded activities. The grading module 217 then aggregates the points across all activities that are configured to be graded for each of the members.

The above presented modules and components of the classroom participation platform 109 can be implemented in hardware, firmware, software, or a combination thereof. Though depicted as a separate entity in FIG. 1, it is contemplated that the classroom participation platform 109 may be implemented for direct operation by respective UE 101. As such, the classroom participation platform 109 may generate direct signal inputs by way of the operating system of the UE 101 for interacting with the applications 103. In another embodiment, one or more of the modules of FIG. 2 and processes of FIGS. 4, 6, 8, and 11 may be implemented for operation by respective UEs, the classroom participation platform 109, or combination thereof. Still further, the classroom participation platform 109 may be integrated for direct operation with services 115, such as in the form of a widget or applet, in accordance with an information and/or subscriber sharing arrangement. The various executions presented herein contemplate any and all arrangements and models.

Figure 3:
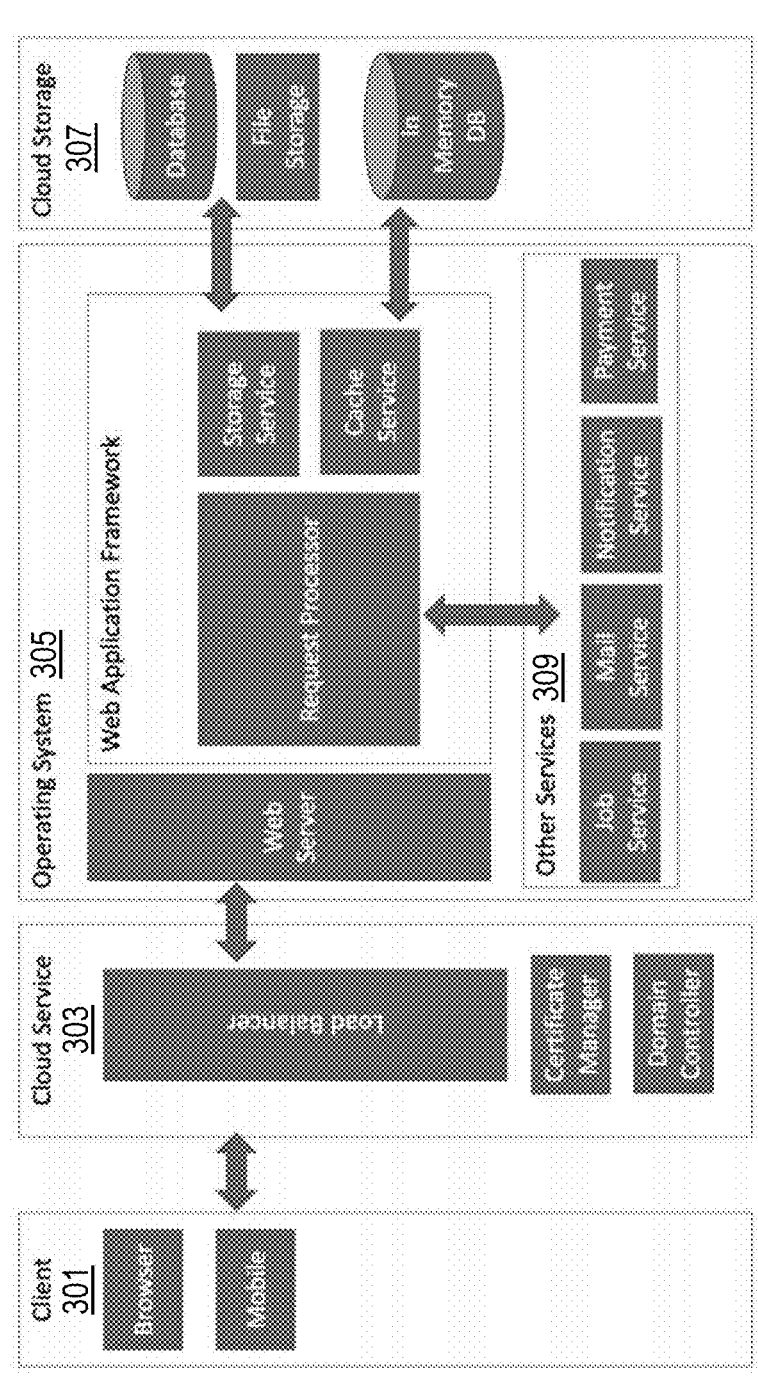
FIG. 3 is a diagram of the system architecture of the system of FIG. 1, according to various example embodiments.

FIG. 3 is a diagram of the system architecture of the system of FIG. 1, according to various example embodiments. As shown from an architectural standpoint, the system 100, in one embodiment, includes a client 301, a cloud service 303, an operating system, 305 and a cloud storage 307 to create and maintain a course experience built on participation. The system 100 can also include Other Services 309: job service, mail service, notification service, and payment service. Under this scenario, the process is mirrored between web and mobile and web platforms allowing near identical user experiences. Each of the various components is discussed in more detail below with respect to FIGS. 5-17.

Figure 19:
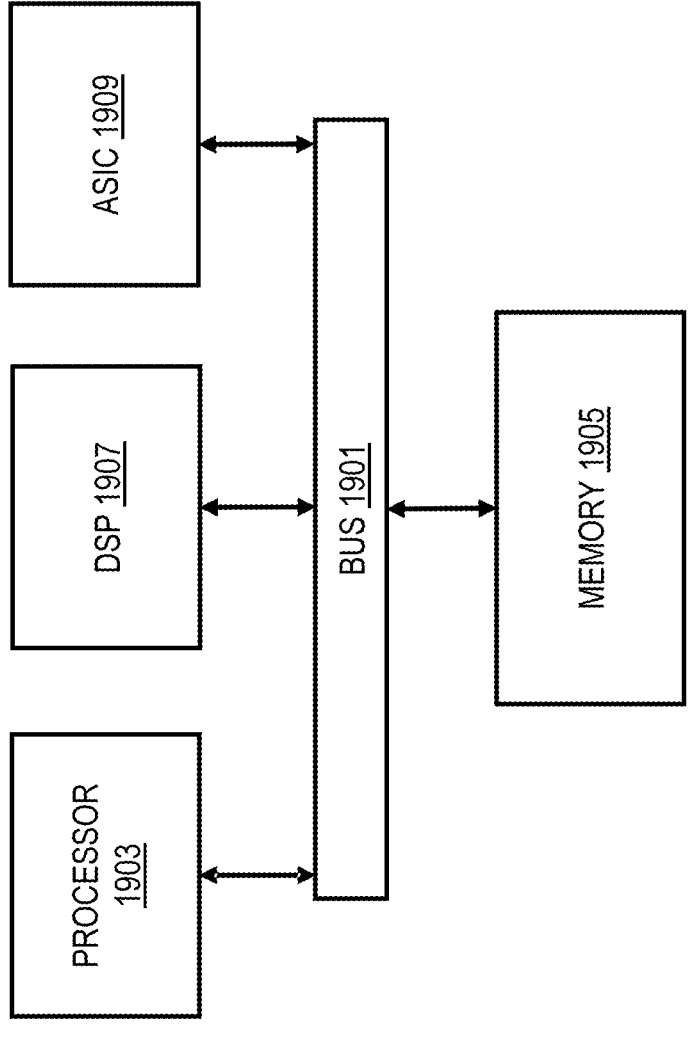
FIG. 19 is a diagram of a chip set that can be used to implement various example embodiments.

FIG. 4 is a flowchart of a process for facilitating participation and generating a participation score, according to one embodiment. In one embodiment, the classroom participation platform 109 performs the process 300 and is implemented in, for instance, a chip set including a processor and a memory as shown in FIG. 19. In step 401, the platform 109 establishes a classroom user group, which typically includes an instructor user and one or more student users (which constitutes a group). The platform 109, per step 403, provides a feed to the group of student users. The feed is reflective of the course materials, and thus, relates to a subject designated for the classroom user group. In step 405, the platform 109 monitors for feedback information by each of the student users in response to the feed. The platform 109 can then attribute a participation credit to corresponding student user(s) based on the feedback information, per step 407. In step 409, the platform 109 generates a participation score for each of the students according to the attributed participation credit. Optionally, the platform 109 can transmit the participation scores to the respective mobile devices (e.g., UEs 101) of the corresponding student users. In this manner, the student users are immediately aware of the impact of their participation efforts, which can stimulate more active participation as a result.

Figure 5:
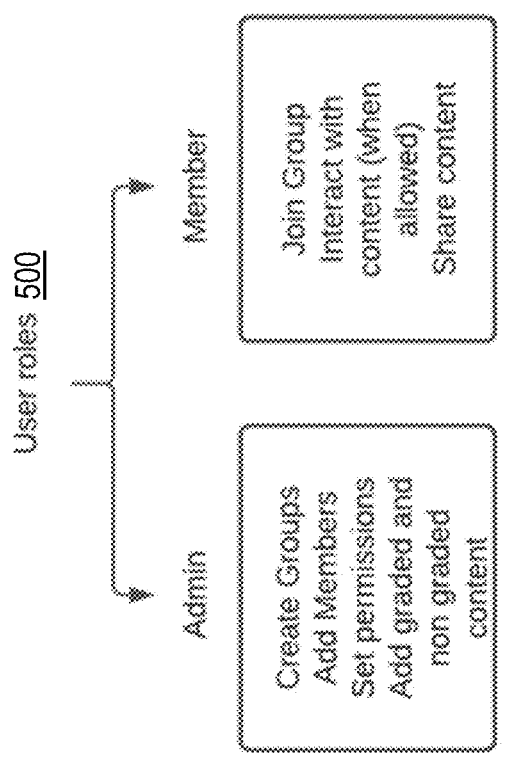
FIG. 5 is a diagram showing types of user roles defined in the participation platform of FIG. 1, according to various example embodiments.
Figures 6A, 6B:
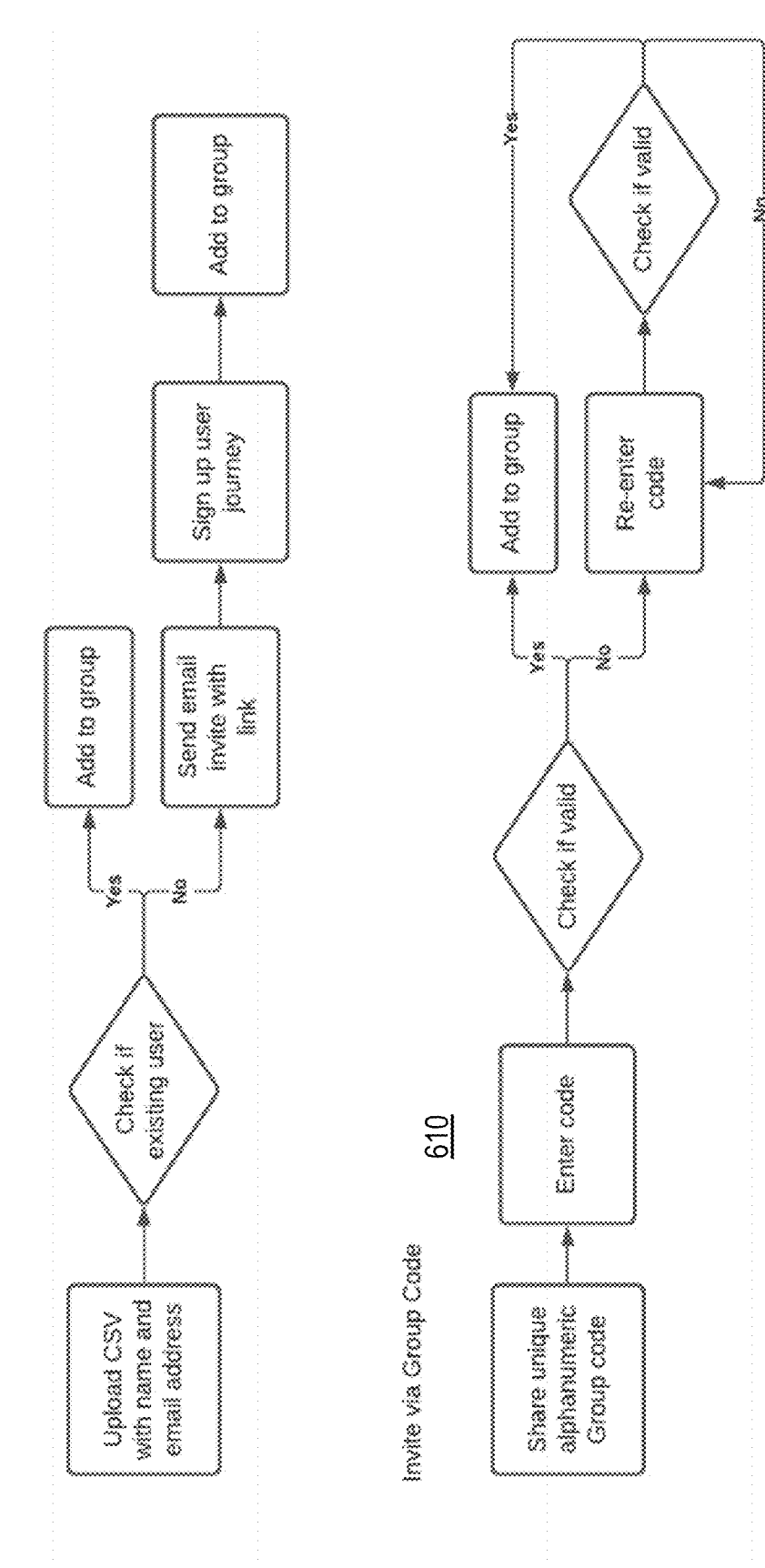
Figure 6C:
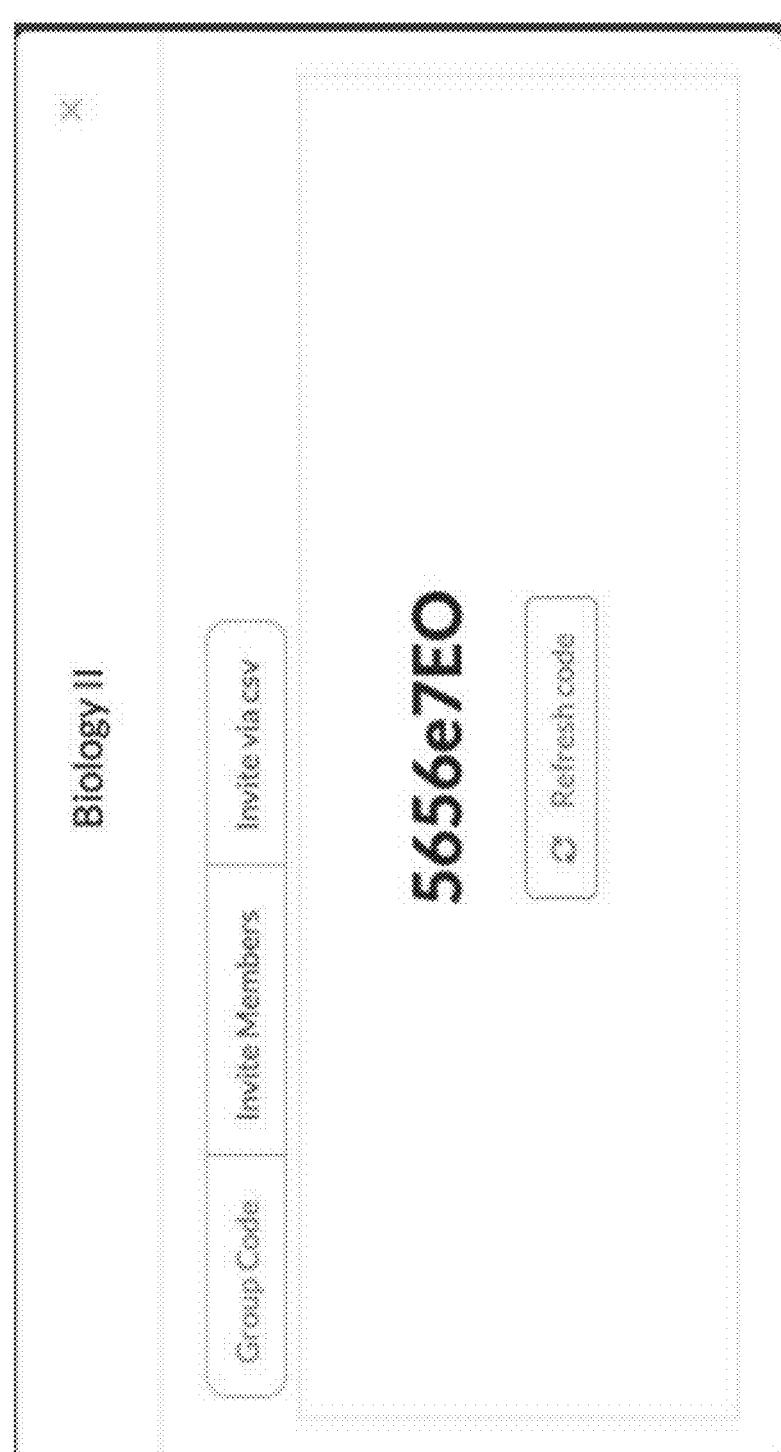
Figure 6D:
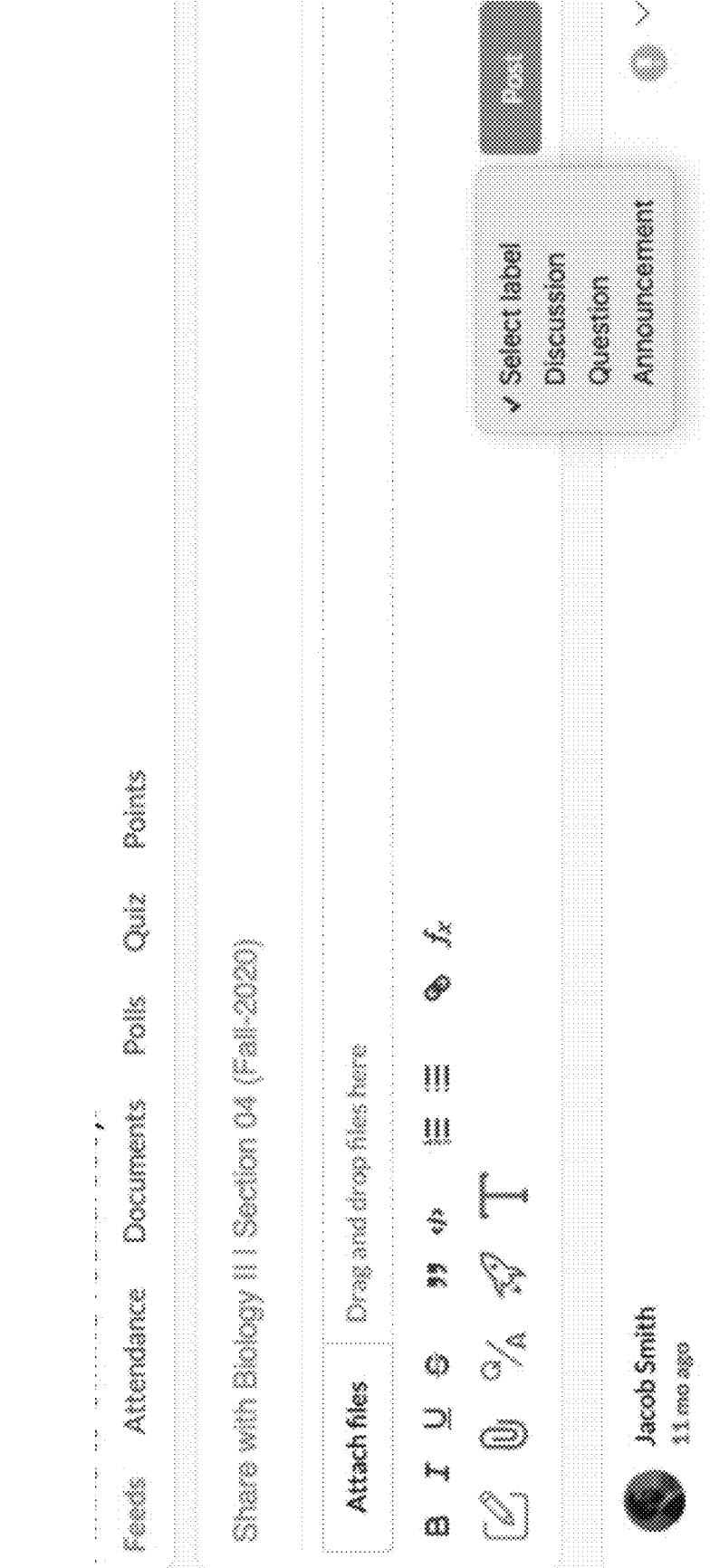
Figure 6F:
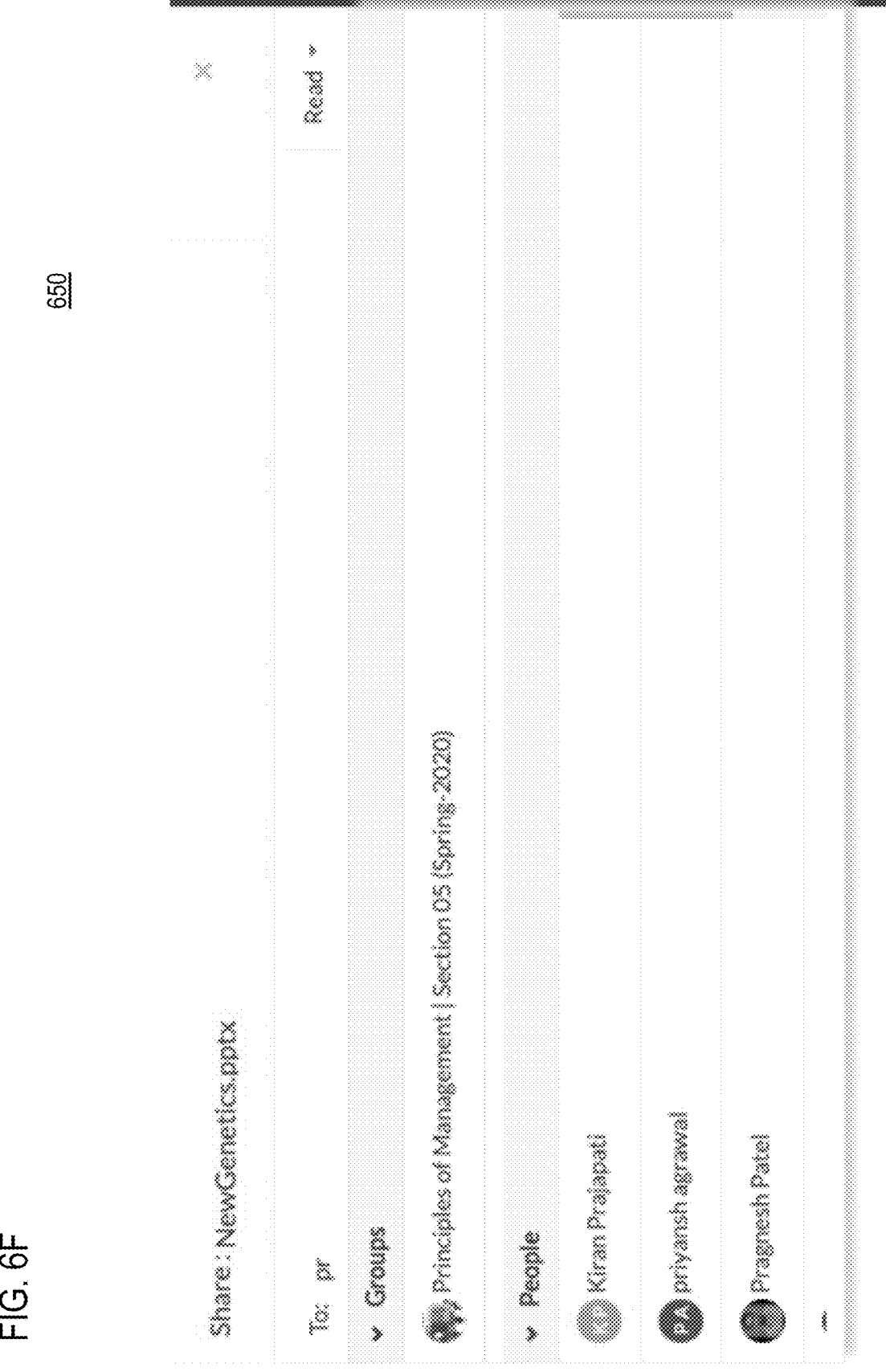

FIG. 5 is a diagram showing types of user roles defined in the participation platform of FIG. 1, according to various example embodiments. As shown, in one embodiment, with respect to user roles 500, users can be classified into two groups. administrative users (or admins) or member users. As explained above, admins can be instructor users, which have a broader set of functions and roles—e.g., create groups, populate them with users, set permissions, and administer testing tools. According to one embodiment, admins can create any number of groups while also being members of any number of groups. Moreover, members can also be part of multiple groups and act in an admin capacity for groups of their own creation.

FIGS. 6A-6F are correspondingly flowcharts 600-650 of the grouping function, and associated graphical user interface (GUI), according to various example embodiments. Groups, as created and managed by the group module 201, act as the centralized platform where all activity takes place. Based on user roles, members can create content or interact with it content created by others.

According to various embodiments, users can be added to a group in three different ways, each with its own corresponding mechanic: (1) adding a member via their email address, (2) sharing a unique code which can be used to join a group, or (3) uploading, e.g., a comma-separated values file (CSV). This allows setting up groups in advance of when member information is known (such as when a roster is present) or on-the-go—e.g., when an indeterminate number of members are present (such as during a conference or live session). Under one scenario, group members have the ability to interact with one another using the many features (e.g., tools) available on the platform 109, which facilitates discussion on a particular topic (e.g., asking a question), obtaining feedback (e.g., using running a poll), and sharing information (e.g., images, documents, or links to online resources). Features are considered the sets of tools (within the platform 109) that allow users to achieve learner participation and interaction. Admins have control over how members interact with each other and the platform 109. These users can, for instance, allow or deny members from making posts and create calendar events. Admins also have the ability to appoint additional admins for a group to distribute the responsibility as they see fit. Each member of a group has the ability to share any type of media, including documents (e.g., a document here refers to files or links) with any other member, groups of members, or the group in its entirety.

Figure 7:
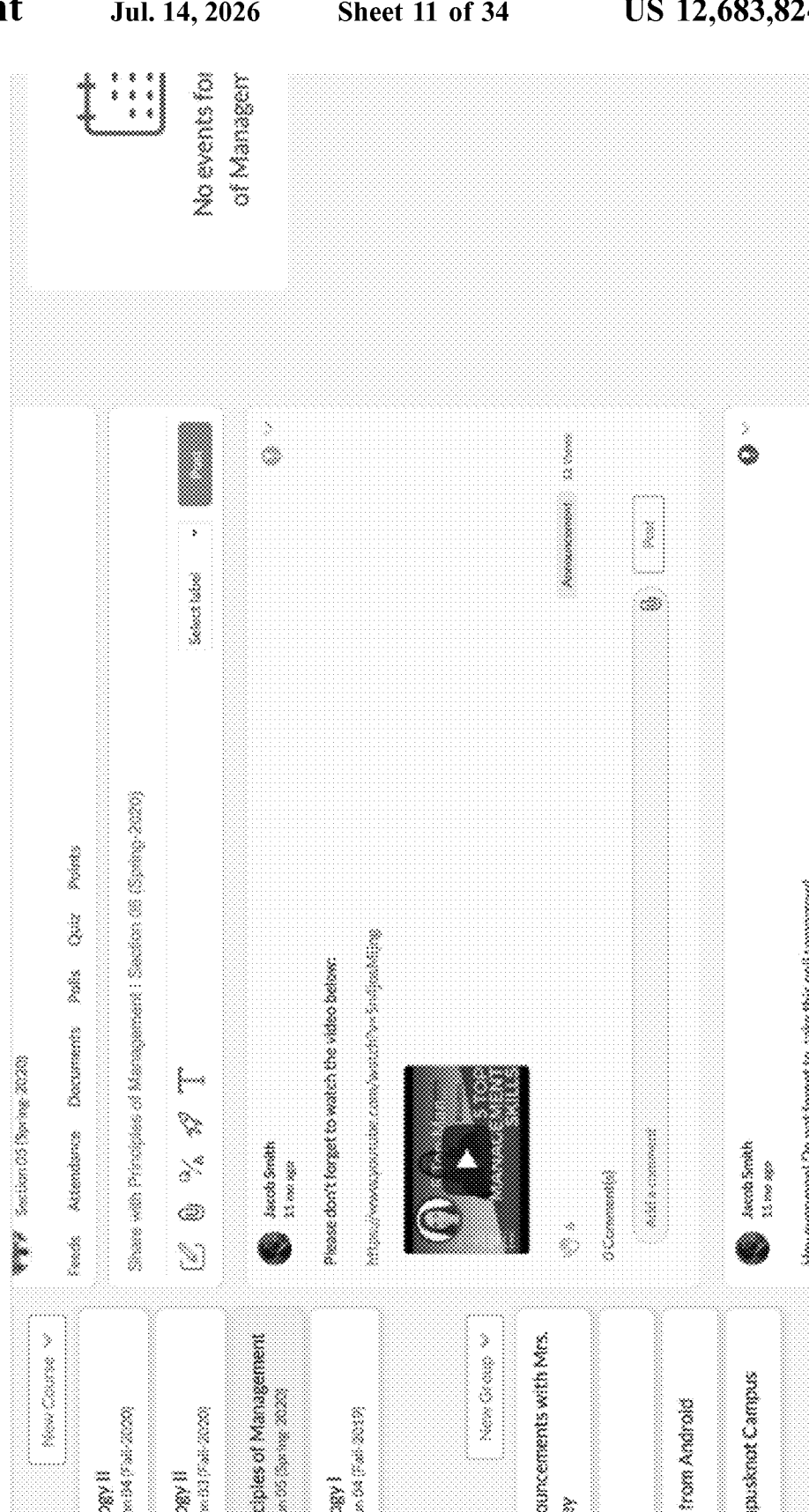
FIG. 7 is a diagram of a GUI for providing a feed for enhancing user participation, according to various example embodiments.

FIG. 7 is a diagram of a GUI 700 for providing a feed for enhancing user participation, according to various example embodiments. By way of example, the feed module 203 provides a feed in a social media style wall feed for users to post content. Posts can be organized by labels; and users are also given the ability to "Applaud" (i.e., "like") certain posts—denoting a post as interesting, important, useful, etc. This set of functionalities allows discussion to be streamlined and ordered, for example, by relevance. In addition, members of the group have the ability to interact with posts by commenting or replying to comments. Admins can also configure posts to have credit attached to them—which may be referred to as "Points Post" or credit attribution, which credits members for commenting on these posts, thereby incentivizing interaction.

Figure 8A:
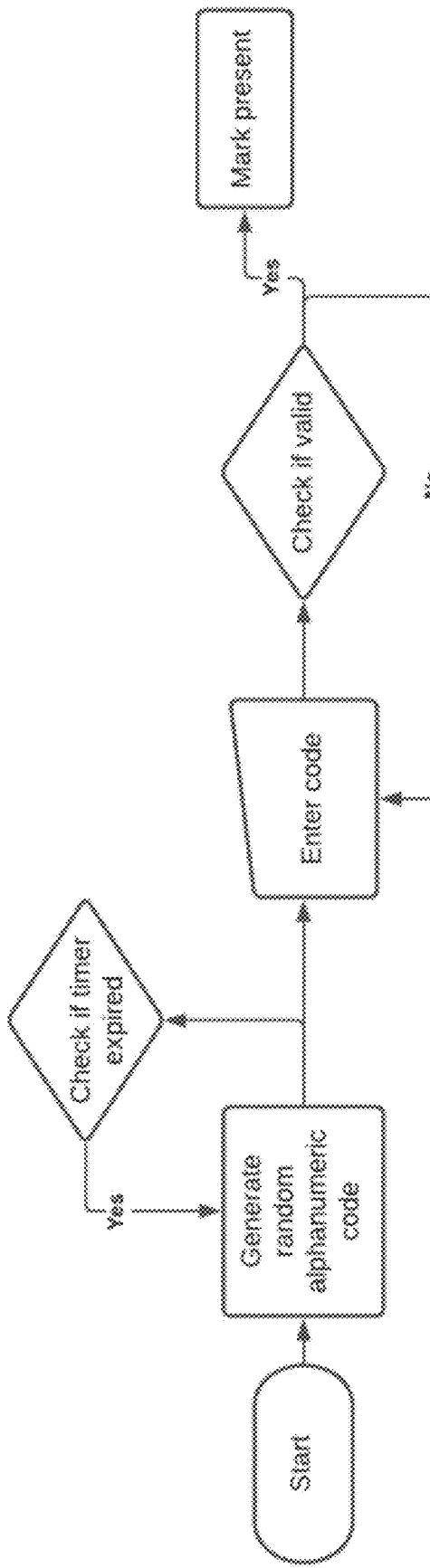
FIGS. 8A-8C are a flowchart of a process for tracking attendance, and associated diagrams of the associated GUI, according to one embodiment.
Figure 8B:
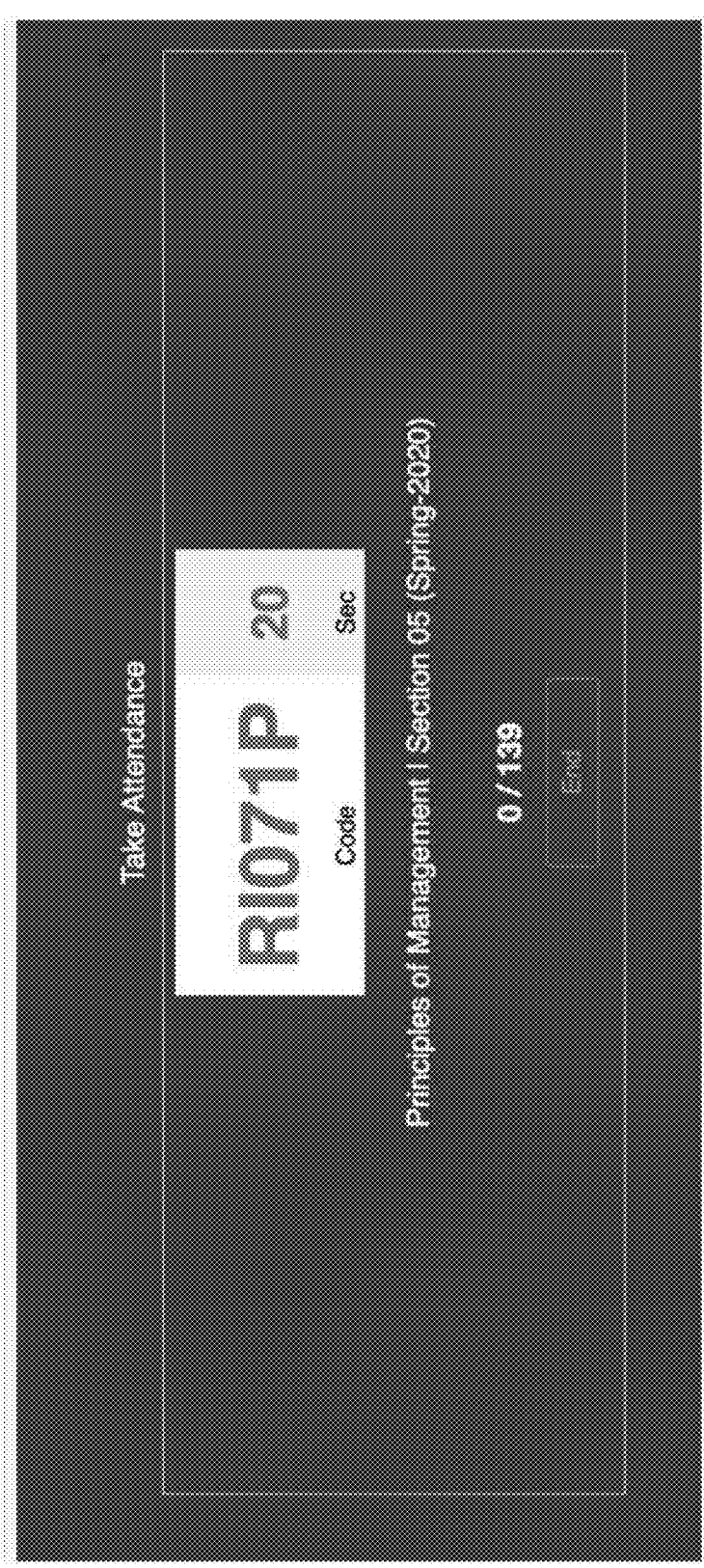
Figure 8C:

FIGS. 8A-8C are a flowchart 800 of a process for tracking attendance, and associated diagrams of the associated GUI 810 and 820, according to one embodiment. The attendance feature, as implemented by attendance module 205, allows admins to identify group members that are actively present during a session. Attendance can be recorded an unlimited number of times in a given day, allowing flexibility in measuring involvement. While attendance is being taken, members are presented with a unique code that refreshes periodically, for example, every 30 seconds (which the users then submit using their devices). In addition, codes are mapped to the groups where they are generated, which allows attendees to seamlessly mark themselves present for their corresponding group by simply entering the code.

Figure 9A:
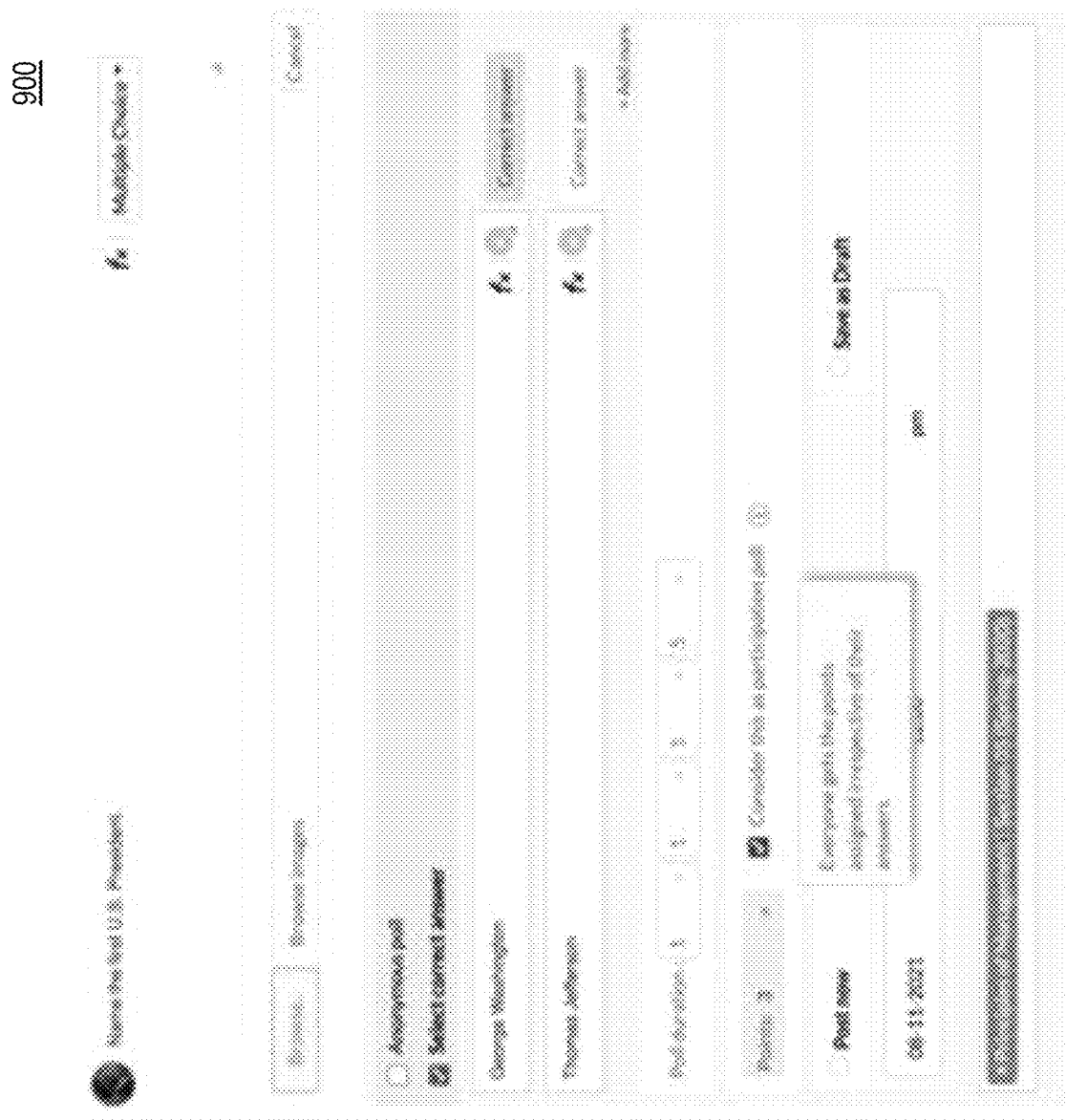
Figure 9B:
Figure 9C:
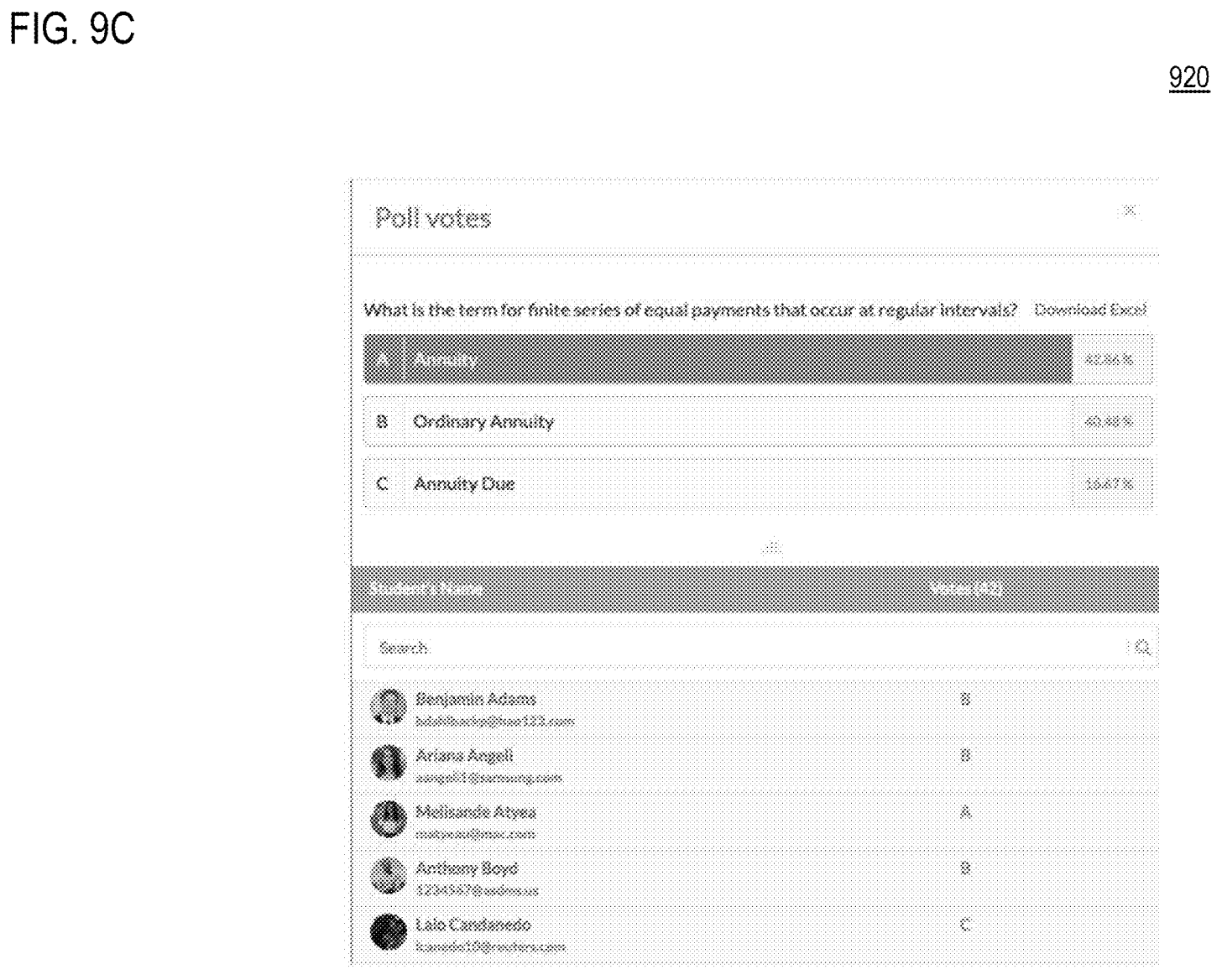
Figure 11A:
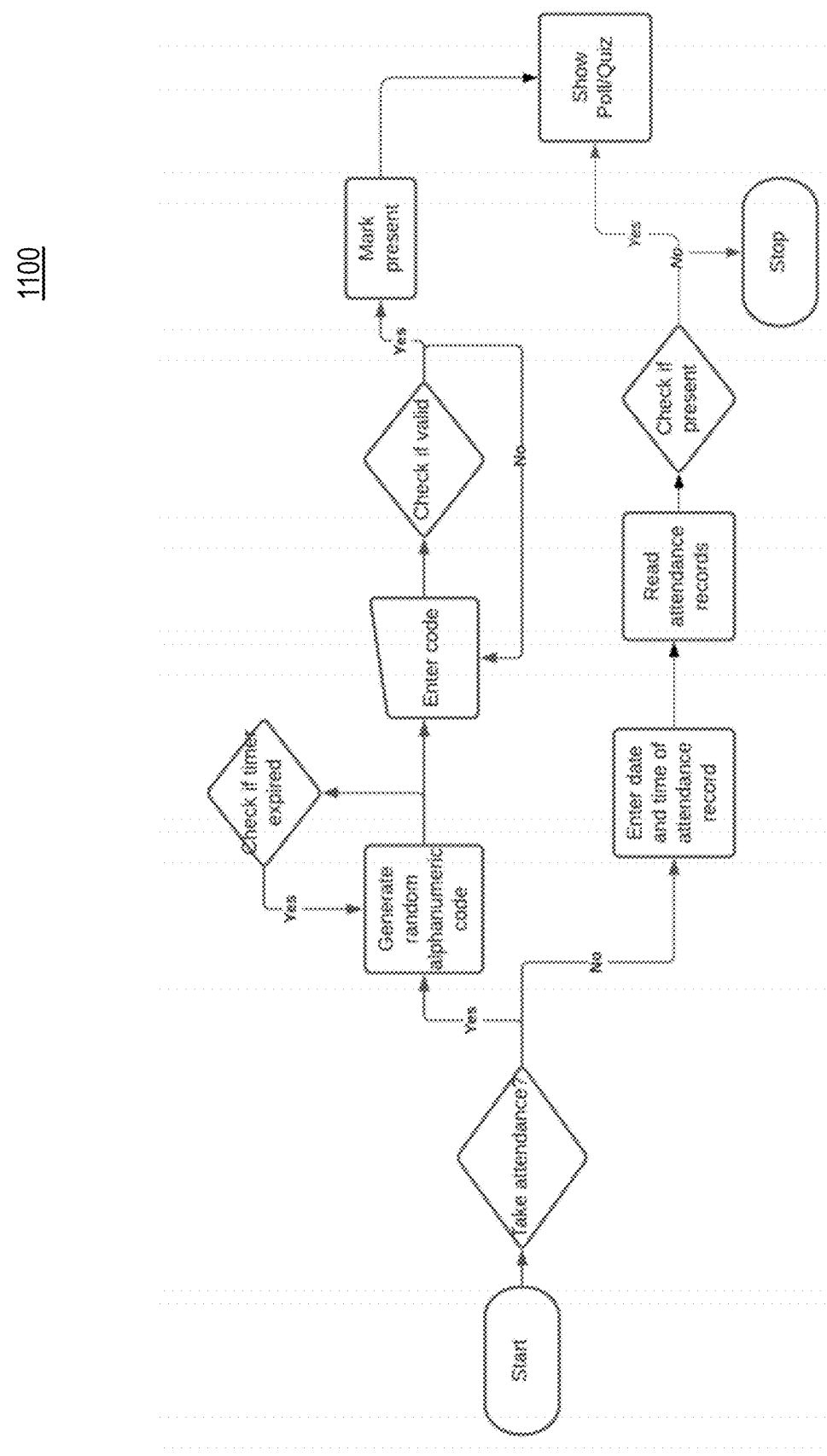
Figure 11B:
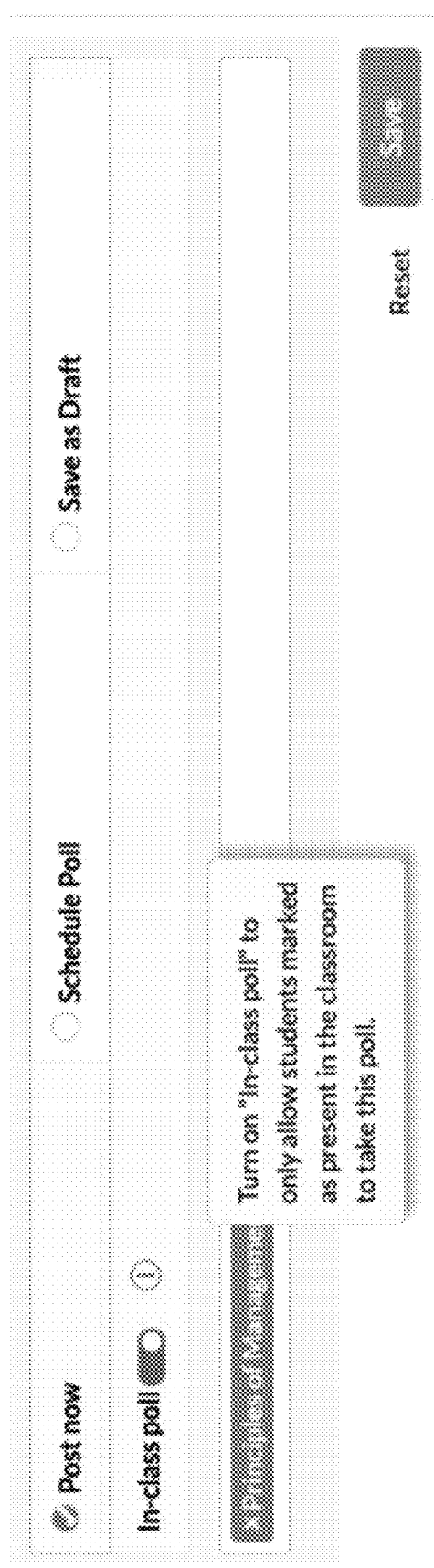

FIGS. 9A-9C are diagrams of a GUI 900-920 for polling of student users engaged in a participation feed, according to various example embodiments. Module 207 supports the polling/quiz (or test) function. Polls are question-based response items that can be configured with multiple choice options or open-ended text fields. In the case of multiple-choice, users are given the option to either denote a correct answer or not (depending on their preference). This feature can be used to either gain feedback, or test concept and material retention. Polls can be configured with a timer to ensure that responses can only be submitted within a given time-frame. This ensures that responses are received in a timely manner and can be customized to run across a wide time range—e.g., anywhere between 5 seconds to 31 days.

FIGS. 10A and 10B are diagrams of a GUI 1000 and 1010 involved with providing a quiz to student users, according to various example embodiments. The quiz or test feature provides users (e.g., instructor users) with the ability to publish sets of questions that can be configured as multiple-choice, open-ended text fields, or match-the-following questions. This feature is typically used to test concept retention. Quizzes, in one embodiment, are configured with a timer to ensure that responses can only be submitted within a given time-frame. This ensures that responses are received in a timely manner. Moreover, the duration of the responses can factor into the amount of points the student users can earn; e.g., the quicker the answer is provided, the more points the students can earn.

FIGS. 11A-11D are a flowchart of a process 1100 for providing an in-class feature, and associated diagrams of the associated GUI 1110-1130, according to various example embodiments. The attendance module 205, in one embodiment, provides an in-class feature that enables admins to incentivize attendance by tying credit-based features like Polls and Quiz with active involvement. When a Poll or a Quiz is configured as "In-class," users are given the option to either take attendance or use a previously taken attendance to only allow those marked "present" to access a Poll or Quiz. Those marked absent are not able to access or view the poll or quiz.

Figure 12A:
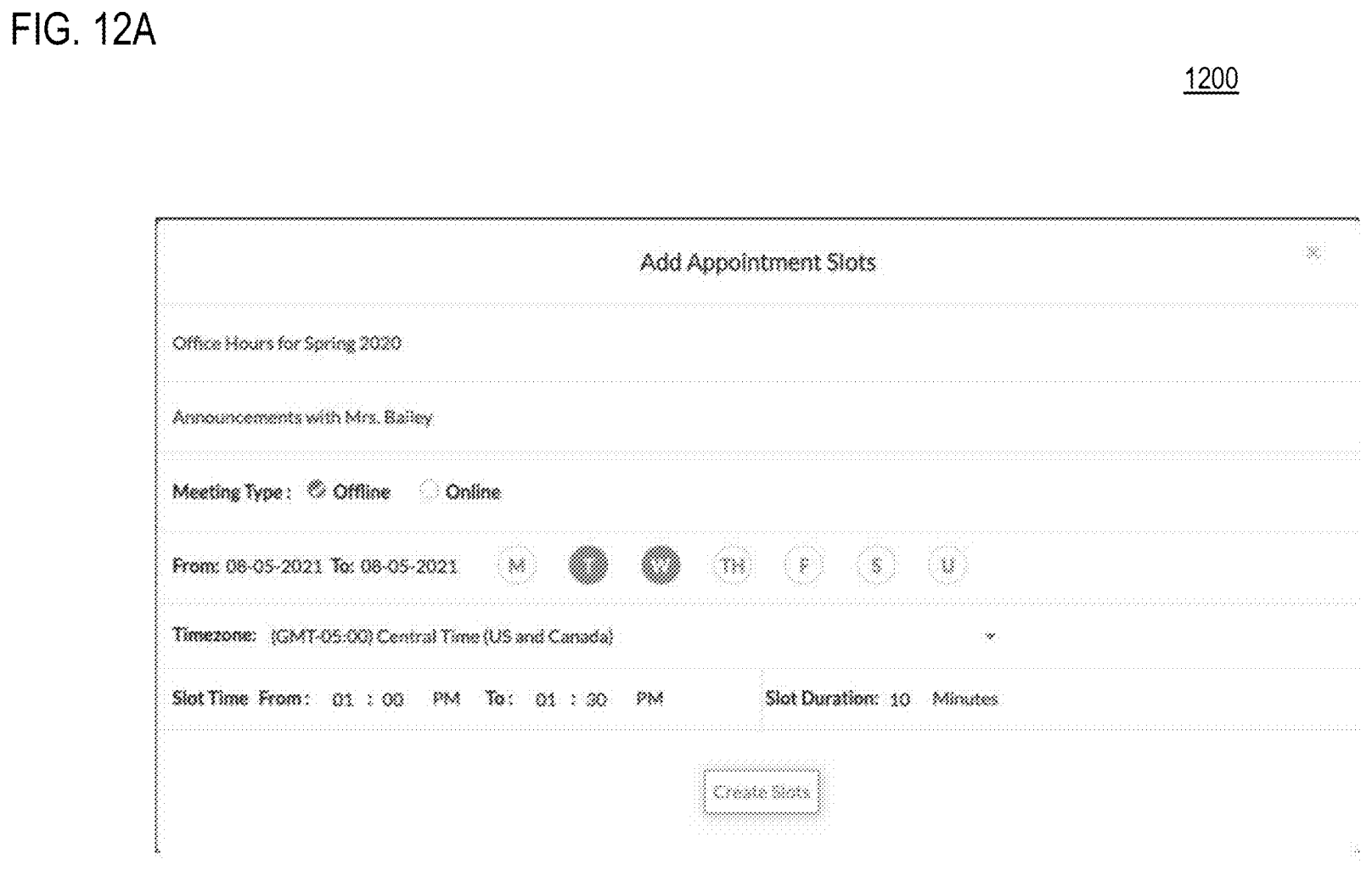
Figure 12B:
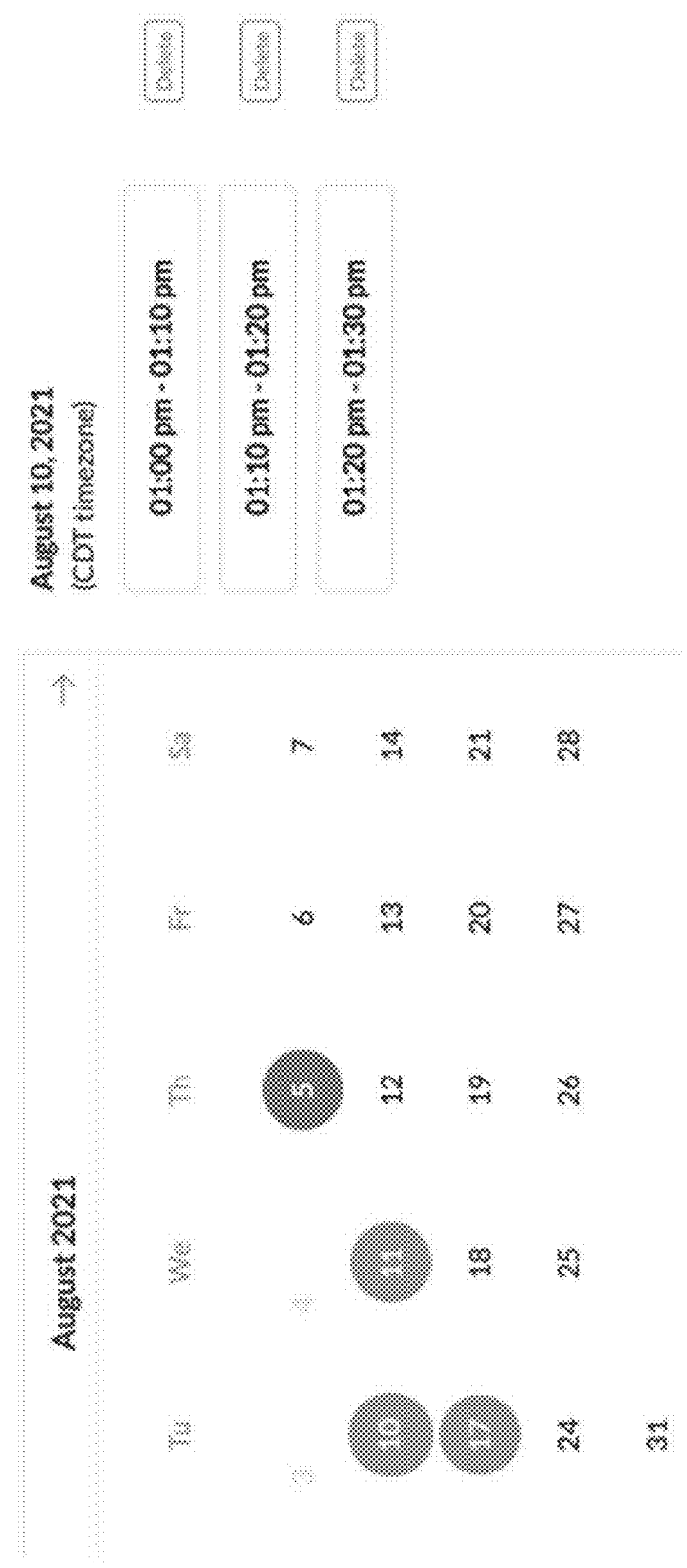
Figure 12C:
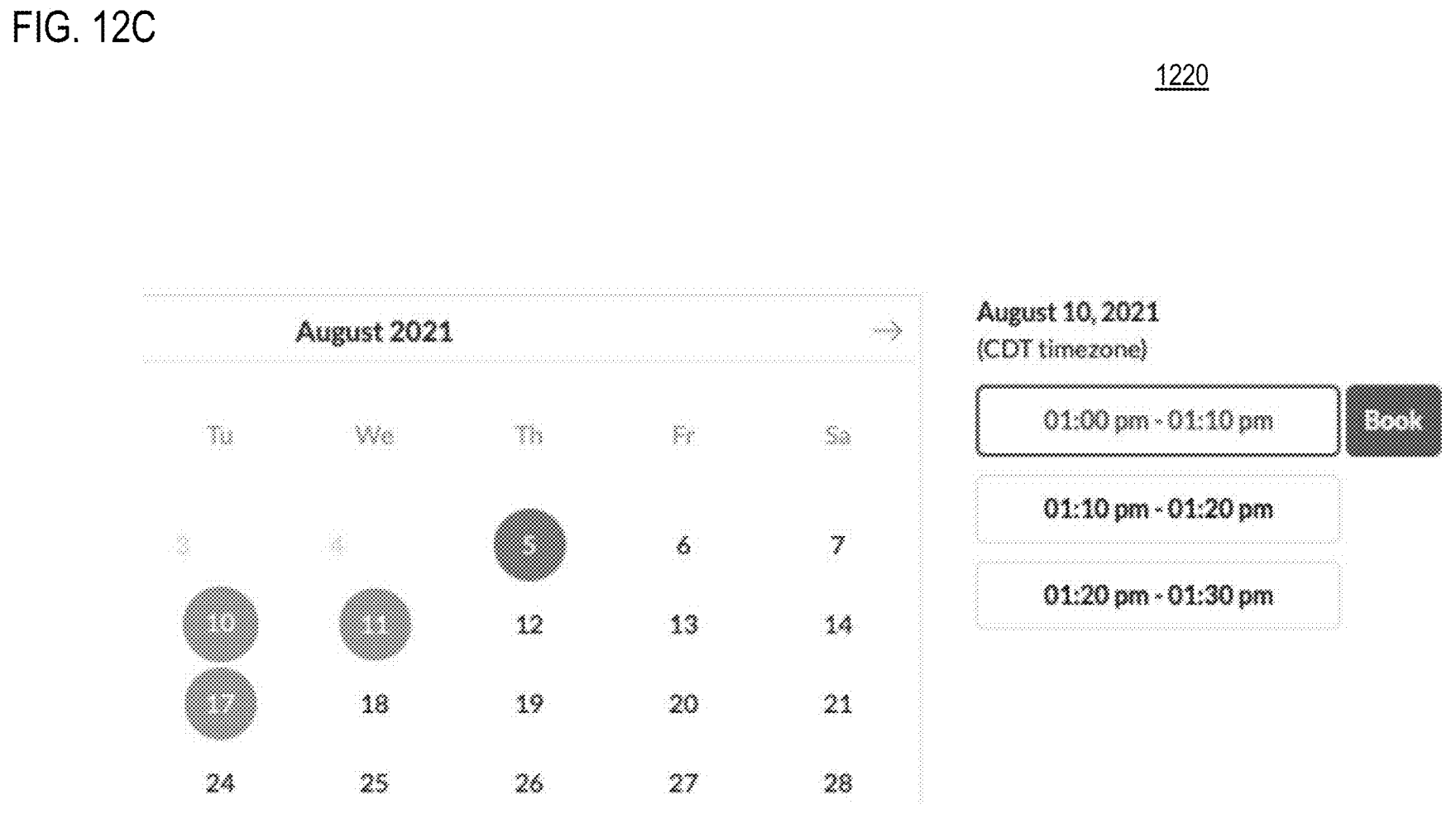

FIGS. 12A-12C are diagrams of a GUI 1200-1220 for scheduling office hours with an instructor user, according to various example embodiments. The platform 109, via the schedule module 209, supports an Office hours feature, which provides admins the ability to schedule blocks of time to meet with users either in-person or online using integrations with various state-of-the-art video conferencing technology. Admins can set availability by day and time and customize the length of meeting time blocks. This allows users to engage in one-on-one interaction with their instructor user (e.g., Group Admin).

In addition to the above-described features, there are supporting features that assist users in disseminating content, tracking deadlines, creating a co-operative environment, and building rapport. These features are shown with respect to FIGS. 13-17.

Figure 13:
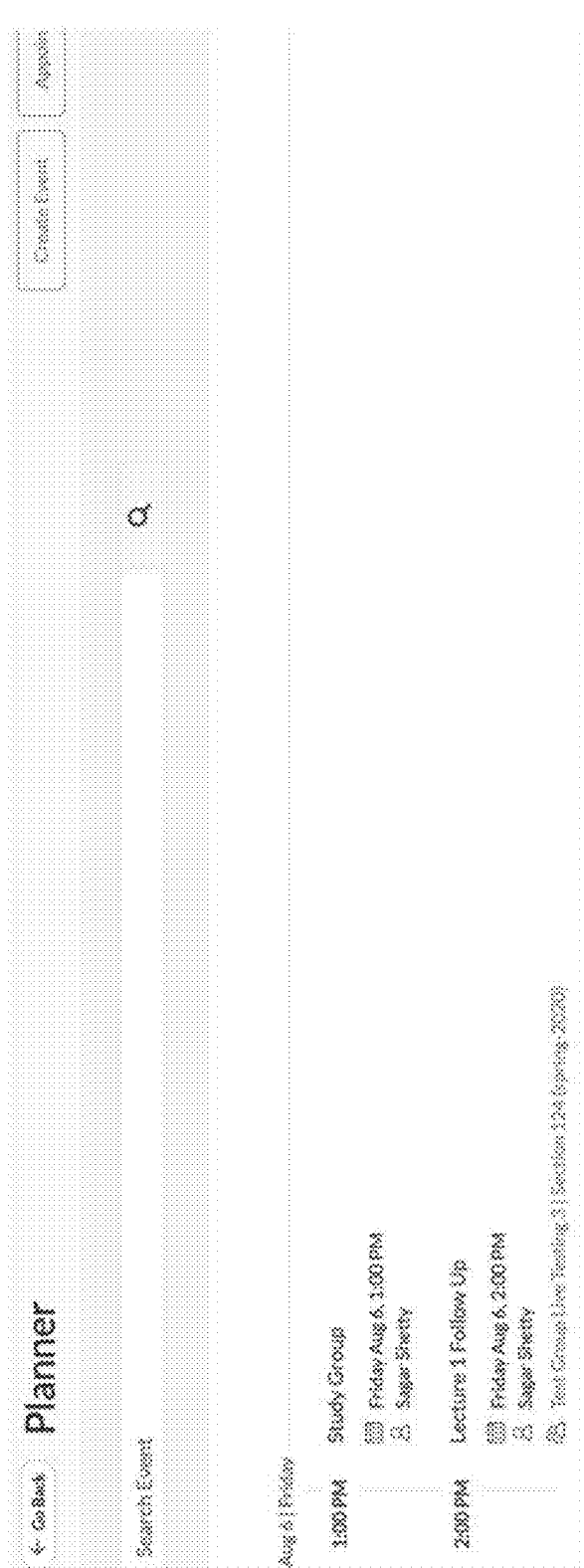
FIG. 13 is a diagram of a GUI for creating and sharing events for determining participation, according to various example embodiments.

FIG. 13 is a diagram of a GUI 1300 for creating and sharing events for determining participation, according to various example embodiments. The platform 109 can also provide a planner feature, which permits users to create and share planner events with one another. Events can be shared with an individual, groups of individuals, groups, and even multiple groups (e.g., for admins managing multiple groups). In addition, the platform 109*m* automatically creates events for timed and/or graded events to assist users with staying on track.

FIG. 14 is a diagram of a GUI 1400 for uploading media used in the system of FIG. 1, according to various example embodiments. The platform 109, per media module 213, supports a documents (or media) feature that enables uploading of documents, images, links, and files (or any media) that are hosted on the cloud, for example. Users have the ability to share content with an individual, groups of individuals, groups, and even multiple groups (e.g., for admins managing multiple groups). This feature thus allows users to generate and disseminate content in a seamless and organized manner.

Figure 15:
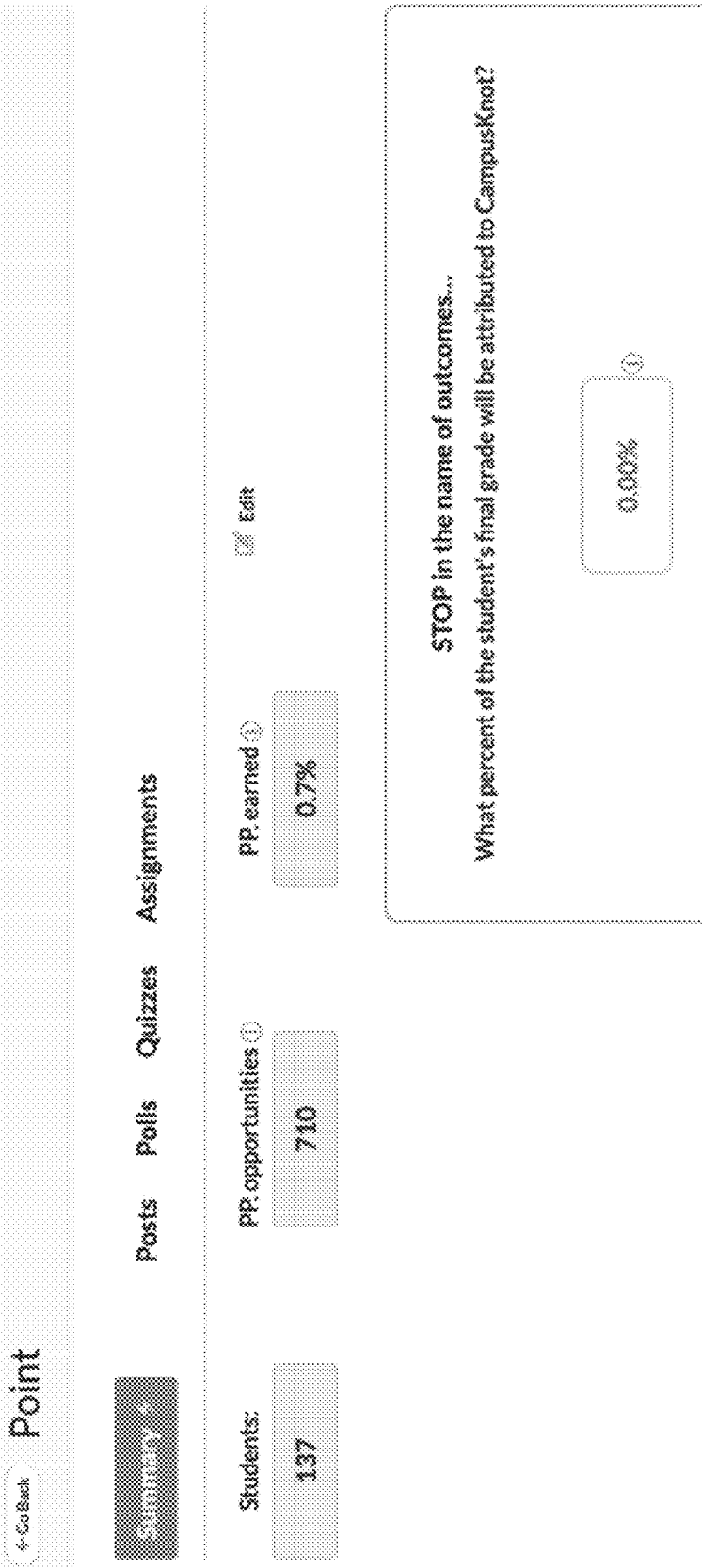
FIG. 15 is a diagram of a GUI for managing points or credits used to determine participation scores, according to various example embodiments.

FIG. 15 is a diagram of a GUI 1500 for managing points or credits used to determine participation scores, according to various example embodiments. The platform 109 further utilizes the credit attribution module 215 to provide a points feature, which involves maintaining a centralized database of credit earned from graded activities. Admins can view performance across all the graded features (e.g., feeds, polls, and quizzes) on an individual and group basis. Additionally, members can view their own individual performance for each group (e.g., classroom community). Points can also be exported, according to one embodiment, as a CSV for record-keeping or to upload onto other databases. These points are then processed by the grading module 217 to generate participation grades for the student users.

FIG. 16 is a diagram of a GUI 1600 for generating notifications to track degree of participation by the student users, according to various example embodiments. The platform 109 provides notifications as real-time alerts in a manner that allow users to keep track of and engage with events.

Figure 17:
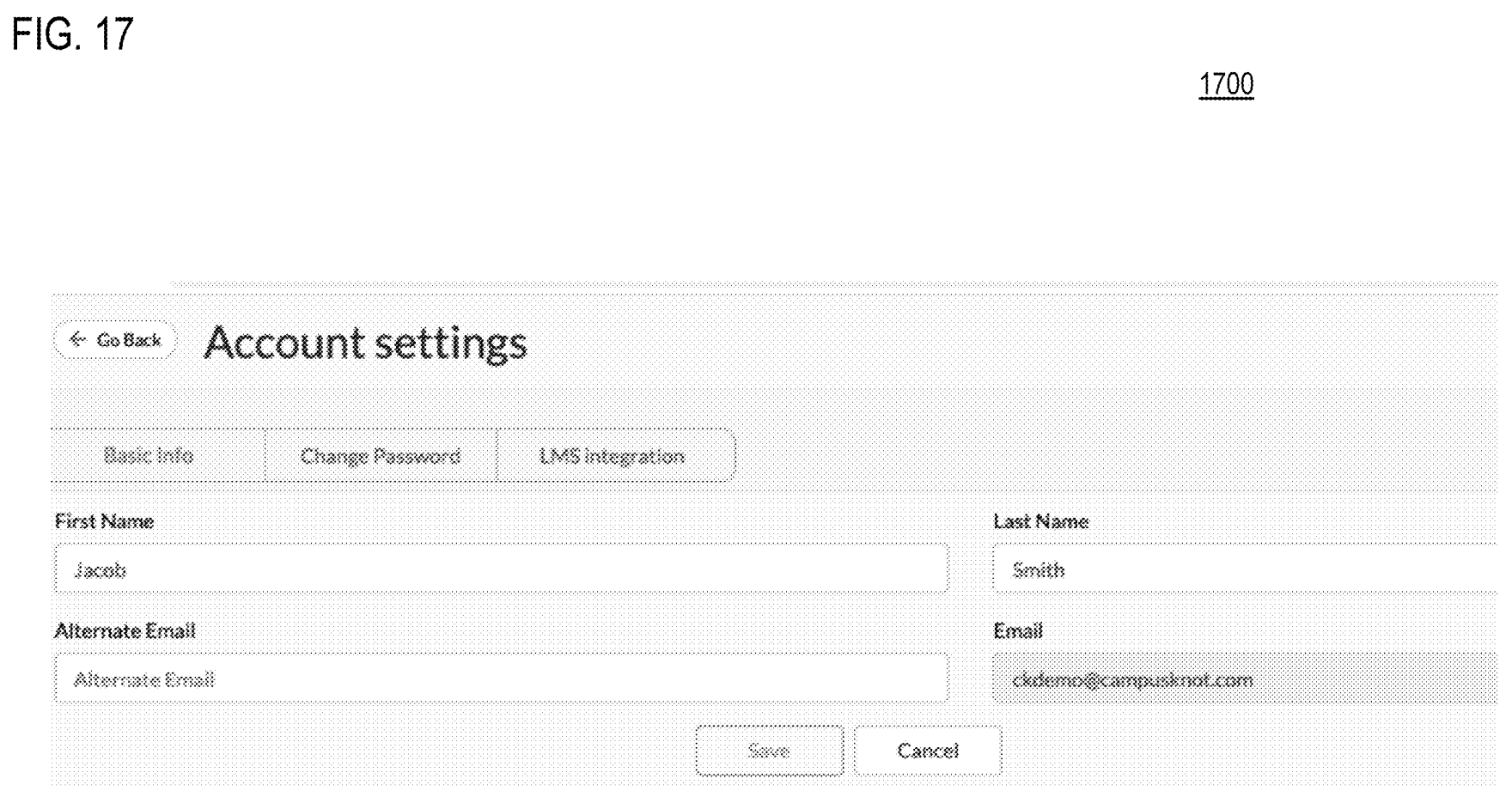

FIG. 17 is a diagram of a GUI 1700 for managing user accounts, according to various example embodiments. An account settings feature, via the user profile module 211, allow users to control account-related settings and subscription details. This feature also permits users to manage credentials and security settings.

The processes described herein for facilitating participation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 18:
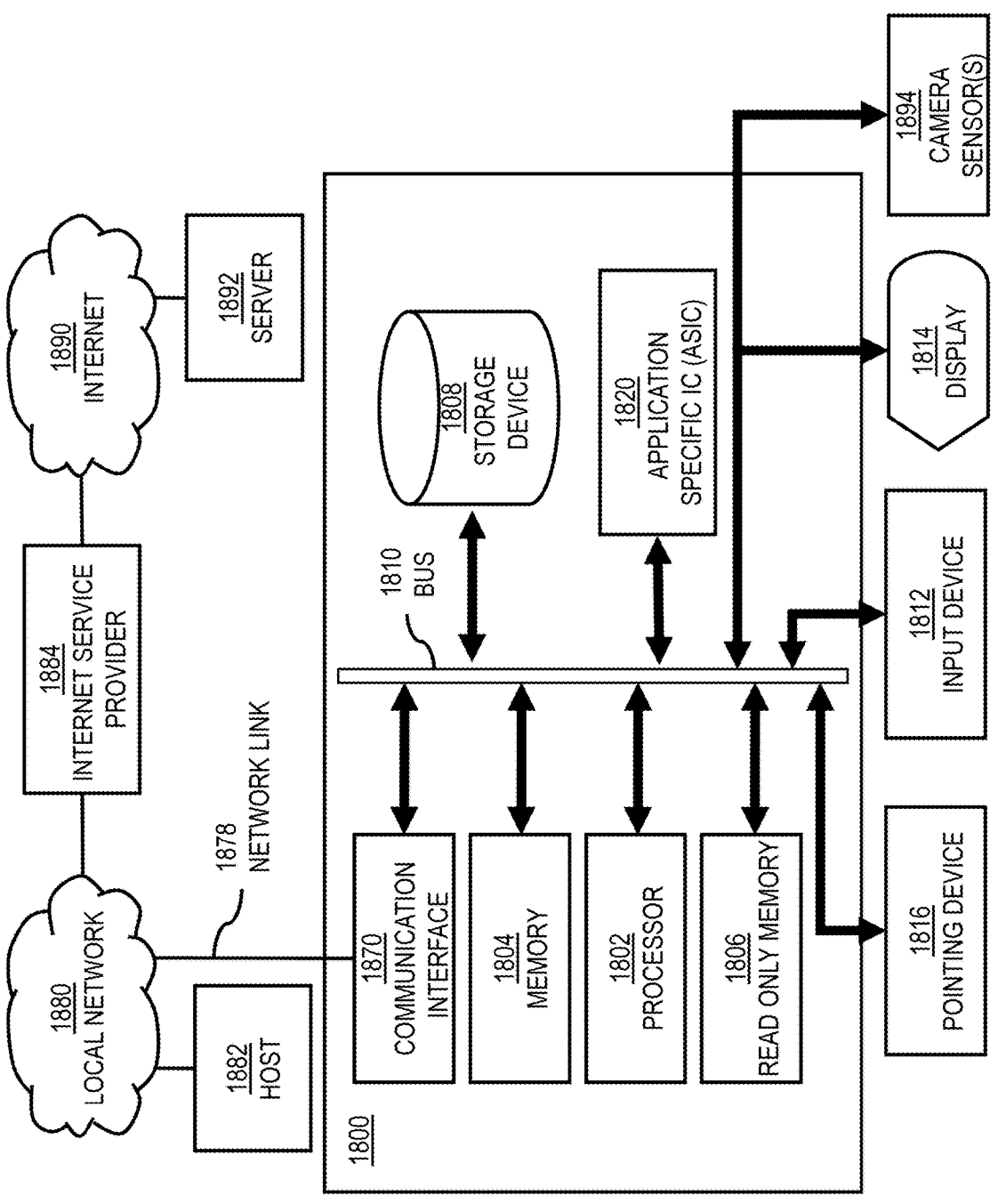
FIG. 18 is a diagram of hardware that can be used to implement various example embodiments.

FIG. 18 illustrates a computer system 1800 upon which various embodiments of the invention may be implemented. Although computer system 1800 is depicted with respect to a particular device or equipment, it is contemplated that other devices or equipment (e.g., network elements, servers, etc.) within FIG. 18 can deploy the illustrated hardware and components of system 1800. Computer system 1800 is programmed (e.g., via computer program code or instructions) to dispatch in support of services or delivery of goods as described herein and includes a communication mechanism such as a bus 1810 for passing information between other internal and external components of the computer system 1800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states ($0$, $1$) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1800, or a portion thereof, constitutes a means for performing one or more steps of the processes described herein, including those of FIGS. 3 and 4.

A bus 1810 includes one or more parallel conductors of information so that information is transferred quickly among devices coupled to the bus 1810. One or more processors 1802 for processing information are coupled with the bus 1810.

A processor (or multiple processors) 1802 performs a set of operations on information as specified by computer program code related to enhancing class participation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1810 and placing information on the bus 1810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1802, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1800 also includes a memory 1804 coupled to bus 1810. The memory 1804, such as a random access memory (RAM) or any other dynamic storage device, stores information including processor instructions for providing real-time feedback during a golf play based, at least in part, on analysis of sensor information. Dynamic memory allows information stored therein to be changed by the computer system 1800. RAM allows a unit of information stored at a location called a memory address to be stored and retrieved independently of information at neighboring addresses. The memory 1804 is also used by the processor 1802 to store temporary values during execution of processor instructions. The computer system 1800 also includes a read only memory (ROM) 1806 or any other static storage device coupled to the bus 1810 for storing static information, including instructions, that is not changed by the computer system 1800. Some memory is composed of volatile storage that loses the information stored thereon when power is lost. Also coupled to bus 1810 is a non-volatile (persistent)

storage device 1808, such as a magnetic disk, optical disk or flash card, for storing information, including instructions, that persists even when the computer system 1800 is turned off or otherwise loses power.

Information, including instructions for providing a real-time feedback during a golf play based, at least in part, on analysis of sensor information, is provided to the bus 1810 for use by the processor from an external input device 1812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1800. Other external devices coupled to bus 1810, used primarily for interacting with humans, include a display device 1814, such as a vacuum fluorescent display (VFD), a liquid crystal display (LCD), a light-emitting diode (LED), an organic light-emitting diode (OLED), a quantum dot display, a virtual reality (VR) headset, a plasma screen, a cathode ray tube (CRT), or a printer for presenting text or images, and a pointing device 1816, such as a mouse, a trackball, cursor direction keys, or a motion sensor, for controlling a position of a small cursor image presented on the display 1814 and issuing commands associated with graphical elements presented on the display 1814, and one or more camera sensors 1894 for capturing, recording and causing to store one or more still and/or moving images (e.g., videos, movies, etc.) which also may comprise audio recordings. In some embodiments, for example, in embodiments in which the computer system 1800 performs all functions automatically without human input, one or more of external input device 1812, a display device 1814 and pointing device 1816 may be omitted.

In the illustrated embodiment, special purpose hardware, such as an application specific integrated circuit (ASIC) 1820, is coupled to bus 1810. The special purpose hardware is configured to perform operations not performed by processor 1802 quickly enough for special purposes. Examples of ASICs include graphics accelerator cards for generating images for display 1814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1800 also includes one or more instances of a communications interface 1870 coupled to bus 1810. Communication interface 1870 provides a one-way or two-way communication coupling to a variety of external devices that operate with their own processors, such as printers, scanners, and external disks. In general, the coupling is with a network link 1878 that is connected to a local network 1880 to which a variety of external devices with their own processors are connected. For example, communication interface 1870 may be a parallel port or a serial port or a universal serial bus (USB) port on a personal computer. In some embodiments, communications interface 1870 is an integrated services digital network (ISDN) card or a digital subscriber line (DSL) card or a telephone modem that provides an information communication connection to a corresponding type of telephone line. In some embodiments, a communication interface 1870 is a cable modem that converts signals on bus 1810 into signals for a communication connection over a coaxial cable or into optical signals for a communication connection over a fiber optic cable. As another example, communications interface 1870 may be a local area network (LAN) card to provide a data communication connection to a compatible LAN, such as Ethernet. Wireless links may also be implemented. For wireless links, the communications interface 1870 sends or receives or both sends and receives electrical, acoustic or electromagnetic signals, including infrared and optical signals, that carry information streams, such as digital data. For example, in wireless handheld devices, such as mobile telephones like cell phones, the communications interface 1870 includes a radio band electromagnetic transmitter and receiver called a radio transceiver. In certain embodiments, the communications interface 1870 enables connection to the communication network 187 for providing real-time feedback during a golf play based, at least in part, on analysis of sensor information to the UE 181.

The term "computer-readable medium" as used herein refers to any medium that participates in providing information to processor 1802, including instructions for execution. Such a medium may take many forms, including, but not limited to a computer-readable storage medium (e.g., non-volatile media, volatile media), and transmission media. Non-transitory media, such as non-volatile media, include, for example, optical or magnetic disks, such as storage device 1808. Volatile media include, for example, dynamic memory 1804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1820.

Network link 1878 typically provides information communication using transmission media through one or more networks to other devices that use or process the information. For example, network link 1878 may provide a connection through local network 1880 to a host computer 1882 or to equipment 1884 operated by an Internet Service Provider (ISP). ISP equipment 1884 in turn provides data communication services through the public, world-wide packet-switching communication network of networks now commonly referred to as the Internet 1890.

A computer called a server host 1892 connected to the Internet hosts a process that provides a service in response to information received over the Internet. For example, server host 1892 hosts a process that provides information representing video data for presentation at display 1814. It is contemplated that the components of system 1800 can be deployed in various configurations within other computer systems, e.g., host 1882 and server 1892.

At least some embodiments of the invention are related to the use of computer system 1800 for implementing some or all of the techniques described herein. According to one embodiment of the invention, those techniques are performed by computer system 1800 in response to processor 1802 executing one or more sequences of one or more processor instructions contained in memory 1804. Such instructions, also called computer instructions, software and program code, may be read into memory 1804 from another computer-readable medium such as storage device 1808 or network link 1878. Execution of the sequences of instructions contained in memory 1804 causes processor 1802 to perform one or more of the method steps described herein. In alternative embodiments, hardware, such as ASIC 1820, may be used in place of or in combination with software to implement the invention. Thus, embodiments of the invention are not limited to any specific combination of hardware and software, unless otherwise explicitly stated herein.

The signals transmitted over network link 1878 and other networks through communications interface 1870, carry information to and from computer system 1800. Computer system 1800 can send and receive information, including program code, through the networks 1880, 1890 among others, through network link 1878 and communications interface 1870. In an example using the Internet 1890, a server host 1892 transmits program code for a particular application, requested by a message sent from computer 1800, through Internet 1890, ISP equipment 1884, local network 1880 and communications interface 1870. The received code may be executed by processor 1802 as it is received, or may be stored in memory 1804 or in storage device 1808 or any other non-volatile storage for later execution, or both. In this manner, computer system 1800 may obtain application program code in the form of signals on a carrier wave.

Various forms of computer readable media may be involved in carrying one or more sequence of instructions or data or both to processor 1802 for execution. For example, instructions and data may initially be carried on a magnetic disk of a remote computer such as host 1882. The remote computer loads the instructions and data into its dynamic memory and sends the instructions and data over a telephone line using a modem. A modem local to the computer system 1800 receives the instructions and data on a telephone line and uses an infra-red transmitter to convert the instructions and data to a signal on an infra-red carrier wave serving as the network link 1878. An infrared detector serving as communications interface 1870 receives the instructions and data carried in the infrared signal and places information representing the instructions and data onto bus 1810. Bus 1810 carries the information to memory 1804 from which processor 1802 retrieves and executes the instructions using some of the data sent with the instructions. The instructions and data received in memory 1804 may optionally be stored on storage device 1808, either before or after execution by the processor 1802.

FIG. 19 illustrates a chip set or chip 1900 upon which various embodiments of the invention may be implemented. Chip set 1900 is programmed to provide real-time feedback during a golf play based, at least in part, on analysis of sensor information as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1900 can be implemented in a single chip. It is further contemplated that in certain embodiments the chip set or chip 1900 can be implemented as a single "system on a chip." It is further contemplated that in certain embodiments a separate ASIC would not be used, for example, and that all relevant functions as disclosed herein would be performed by a processor or processors. Chip set or chip 1900, or a portion thereof, constitutes a means for performing one or more steps of providing user interface navigation information associated with the availability of functions. Chip set or chip 1900, or a portion thereof, constitutes a means for performing one or more steps of enhancing class participation.

In one embodiment, the chip set or chip 1900 includes a communication mechanism such as a bus 1901 for passing information among the components of the chip set 1900. A processor 1903 has connectivity to the bus 1901 to execute instructions and process information stored in, for example, a memory 1905. The processor 1903 may include one or more processing cores with each core configured to perform independently. A multi-core processor enables multiprocessing within a single physical package. Examples of a multi-core processor include two, four, eight, or greater numbers of processing cores. Alternatively or in addition, the processor 1903 may include one or more microprocessors configured in tandem via the bus 1901 to enable independent execution of instructions, pipelining, and multithreading. The processor 1903 may also be accompanied with one or more specialized components to perform certain processing functions and tasks such as one or more digital signal processors (DSP) 1907, or one or more application-specific integrated circuits (ASIC) 1909. A DSP 1907 typically is configured to process real-world signals (e.g., sound) in real time independently of the processor 1903. Similarly, an ASIC 1909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1900 includes merely one or more processors and some software and/or firmware supporting and/or relating to and/or for the one or more processors.

The processor 1903 and accompanying components have connectivity to the memory 1905 via the bus 1901. The memory 1905 includes both dynamic memory (e.g., RAM, magnetic disk, writable optical disk, etc.) and static memory (e.g., ROM, CD-ROM, etc.) for storing executable instructions that when executed perform the inventive steps described herein to provide enhancing class participation. The memory 1905 also stores the data associated with or generated by the execution of the inventive steps.

Figure 20:
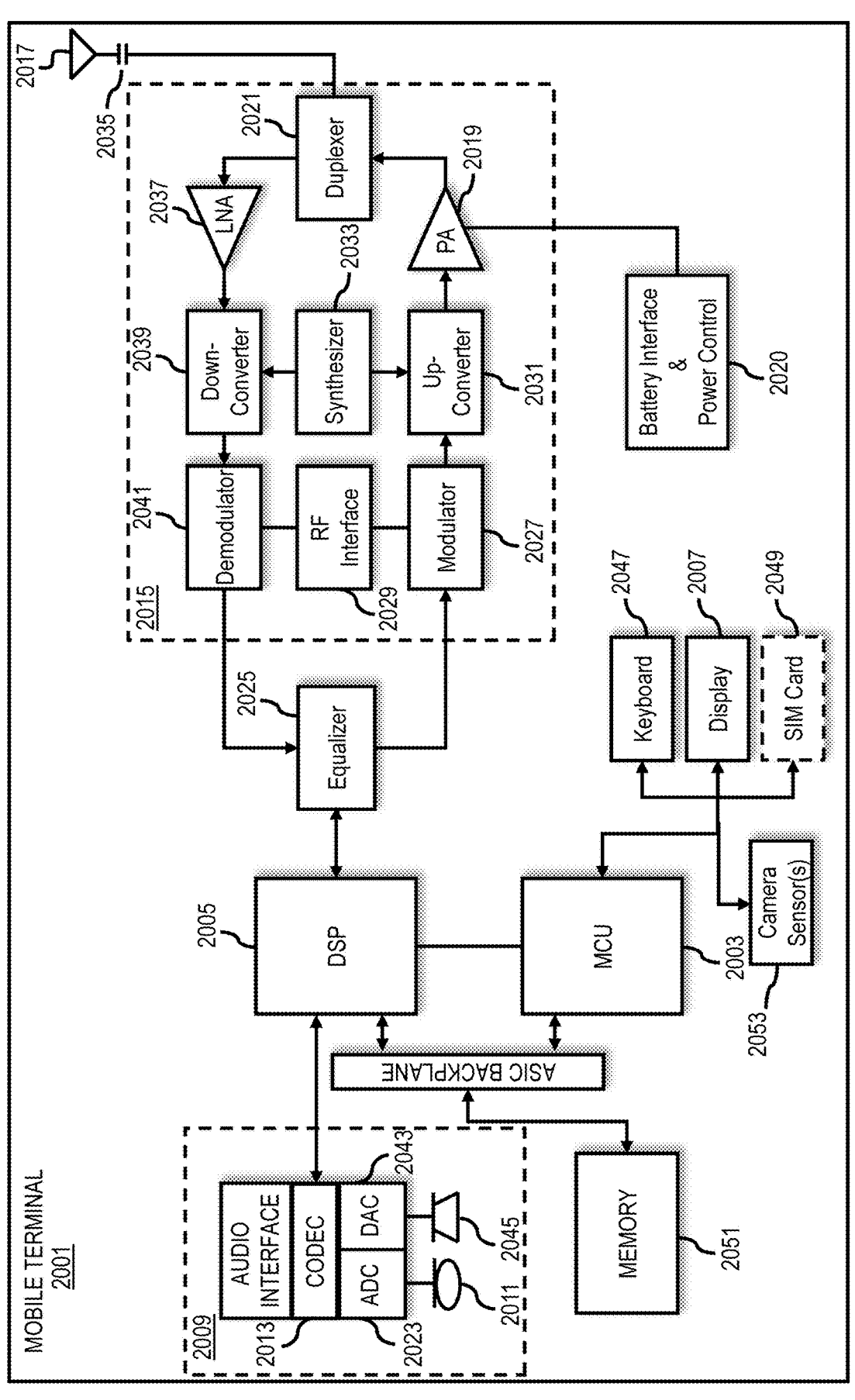
FIG. 20 is a diagram of a mobile terminal (e.g., handset) that can be used to implement various example embodiments.

FIG. 20 is a diagram of exemplary components of a mobile terminal (e.g., handset) for communications, which is capable of operating in the system of FIG. 1, according to one embodiment. In some embodiments, mobile terminal 2001, or a portion thereof, constitutes a means for performing one or more steps of enhancing class participation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 2003, a Digital Signal Processor (DSP) 2005, and a receiver/transmitter unit including a microphone gain control unit and a speaker gain control unit. A main display unit 2007 provides a display to the user in support of various applications and mobile terminal functions that perform or support the steps of enhancing class participation. The display 2007 includes display circuitry configured to display at least a portion of a user interface of the mobile terminal (e.g., mobile telephone). Additionally, the display 2007 and display circuitry are configured to facilitate user control of at least some functions of the mobile terminal. An audio function circuitry 2009 includes a microphone 2011 and microphone amplifier that amplifies the speech signal output from the microphone 2011. The amplified speech signal output from the microphone 2011 is fed to a coder/decoder (CODEC) 2013.

A radio section 2015 amplifies the power and converts frequency in order to communicate with a base station, which is included in a mobile communication system, via antenna 2017. The power amplifier (PA) 2019 and the transmitter/modulation circuitry are operationally responsive to the MCU 2003, with an output from the PA 2019 coupled to the duplexer 2021 or circulator or antenna switch, as known in the art. The PA 2019 also couples to a battery interface and power control unit 2020.

In use, a user of mobile terminal 2001 speaks into the microphone 2011 and his or her voice along with any detected background noise is converted into an analog voltage. The analog voltage is then converted into a digital signal through the Analog to Digital Converter (ADC) 2023. The control unit 2003 routes the digital signal into the DSP 2005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 2025 for compensation of any frequency-dependent impairments that occur during transmission though the air such as phase and amplitude distortion. After equalizing the bit stream, the modulator 2027 combines the signal with an RF signal generated in the RF interface 2029. The modulator 2027 generates a sine wave by way of frequency or phase modulation. In order to prepare the signal for transmission, an up-converter 2031 combines the sine wave output from the modulator 2027 with another sine wave generated by a synthesizer 2033 to achieve the desired frequency of transmission. The signal is then sent through a PA 2019 to increase the signal to an appropriate power level. In practical systems, the PA 2019 acts as a variable gain amplifier whose gain is controlled by the DSP 2005 from information received from a network base station. The signal is then filtered within the duplexer 2021 and optionally sent to an antenna coupler 2035 to match impedances to provide maximum power transfer. Finally, the signal is transmitted via antenna 2017 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 2001 are received via antenna 2017 and immediately amplified by a low noise amplifier (LNA) 2037. A down-converter 2039 lowers the carrier frequency while the demodulator 2041 strips away the RF leaving only a digital bit stream. The signal then goes through the equalizer 2025 and is processed by the DSP 2005. A Digital to Analog Converter (DAC) 2043 converts the signal and the resulting output is transmitted to the user through the speaker 2045, all under control of a Main Control Unit (MCU) 2003 which can be implemented as a Central Processing Unit (CPU).

The MCU 2003 receives various signals including input signals from the keyboard 2047. The keyboard 2047 and/or the MCU 2003 in combination with other user input components (e.g., the microphone 2011) comprise a user interface circuitry for managing user input. The MCU 2003 runs a user interface software to facilitate user control of at least some functions of the mobile terminal 2001 to provide enhancing class participation. The MCU 2003 also delivers a display command and a switch command to the display 2007 and to the speech output switching controller, respectively. Further, the MCU 2003 exchanges information with the DSP 2005 and can access an optionally incorporated SIM card 2049 and a memory 2051. In addition, the MCU 2003 executes various control functions required of the terminal. The DSP 2005 may, depending upon the implementation, perform any of a variety of conventional digital processing functions on the voice signals. Additionally, DSP 2005 determines the background noise level of the local environment from the signals detected by microphone 2011 and sets the gain of microphone 2011 to a level selected to compensate for the natural tendency of the user of the mobile terminal 2001.

The CODEC 2013 includes the ADC 2023 and DAC 2043. The memory 2051 stores various data including call incoming tone data and is capable of storing other data including music data received via, e.g., the global Internet. The software module could reside in RAM memory, flash memory, registers, or any other form of writable storage medium known in the art. The memory device 2051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 2049 carries, for instance, important information, such as the cellular phone number, the carrier supplying service, subscription details, and security information. The SIM card 2049 serves primarily to identify the mobile terminal 2001 on a radio network. The card 2049 also contains a memory for storing a personal telephone number registry, text messages, and user specific mobile terminal settings.

Further, one or more camera sensors 2053 may be incorporated onto the mobile station 2001 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

establishing a classroom user group including an instructor user and one or more student users;

providing a feed to the one or more student users, wherein the feed relates to a subject designated for the classroom user group, wherein the feed is a social media style wall feed for the one or more student users to post content, and wherein the content includes graded content designated as graded within the platform by the instructor user associated with the classroom user group and non-graded content designated as non-graded within the platform by the instructor user associated with the classroom user group;

monitoring for feedback information by each of the one or more student users in response to the feed, wherein the feedback information includes posting a comment to the feed, replying to a post in the feed, or a combination thereof;

attributing a participation credit to corresponding one or more of the student users based on the feedback information and the designation of the content as graded content by the instructor user; and generating a participation score for each of the one or more students according to the attributed participation credit based on the feedback information corresponding to the graded content designated by the instructor user.

2. The method of claim 1, further comprising:

receiving media from the one or more student users, wherein the participation score is generated based on the received media.

3. The method of claim 1, further comprising:

updating the feed; and dynamically generating a quiz based on the updated feed.

4. The method of claim 1, further comprising:

initiating transmission of one of the participation scores to a device of a corresponding one of the one or more student users.

5. The method of claim 1, further comprising:

generating a code for the classroom user group; and tracking attendance of the one or more student users based on the code.

6. The method of claim 5, further comprising:

initiating transmission of the code to a device associated with the one or more student users; and receiving a confirmation message from the device in response to the code, wherein the confirmation message indicates successful input of the code into the device.

7. The method of claim 6, further comprising:

generating a new code upon expiration of the code.

8. A system comprising:

a memory configured to store computer-executable instructions; and one or more processors configured to execute the instructions to:

establish a classroom user group including an instructor user and one or more student users;

provide a feed to the one or more student users, wherein the feed relates to a subject designated for the classroom user group, wherein the feed is a social media style wall feed for the one or more student users to post content, and wherein the content includes graded content designated as graded within the platform by the instructor user associated with the classroom user group and non-graded content designated as non-graded within the platform by the instructor user associated with the classroom user group;

monitor for feedback information by each of the one or more student users in response to the feed, wherein the feedback information includes posting a comment to the feed, replying to a post in the feed, or a combination thereof;

attribute a participation credit to corresponding one or more of the student users based on the feedback information and the designation of the content as graded content by the instructor user; and generate a participation score for each of the one or more students according to the attributed participation credit based on the feedback information corresponding to the graded content designated by the instructor user.

9. The system of claim 8, wherein the one or more processors are further configured to execute the instructions to:

receive media from the one or more student users, wherein the participation score is generated based on the received media.

10. The system of claim 8, wherein the one or more processors are further configured to execute the instructions to:

update the feed; and dynamically generate a quiz based on the updated feed.

11. The system of claim 8, wherein the one or more processors are further configured to execute the instructions to:

initiate transmission of one of the participation scores to a device of a corresponding one of the student users.

12. The system of claim 8, wherein the one or more processors are further configured to execute the instructions to:

generate a code for the classroom user group; and track attendance of the one or more student users based on the code.

13. The system of claim 12, wherein the one or more processors are further configured to execute the instructions to:

initiate transmission of the code to a device associated with the one or more student users; and receive a confirmation message from the device in response to the code, wherein the confirmation message indicates successful input of the code into the device.

14. The system of claim 13, wherein the one or more processors are further configured to execute the instructions to:

generate a new code upon expiration of the code.

15. A non-transitory computer-readable storage medium carrying one or more sequences of one or more instructions which, when executed by one or more processors, cause an apparatus to:

establish a classroom user group including an instructor user and one or more student users;

provide a feed to the one or more student users, wherein the feed relates to a subject designated for the classroom user group, and wherein the feed is a social media style wall feed for the one or more student users to post content, and wherein the content includes graded content designated as graded within the platform by the instructor user associated with the classroom user group and non-graded content designated as non-graded within the platform by the instructor user associated with the classroom user group; that are both specified by the instructor user;

monitor for feedback information by each of the one or more student users in response to the feed, wherein the feedback information includes posting a comment to the feed, replying to a post in the feed, or a combination thereof;

attribute a participation credit to corresponding one or more of the student users based on the feedback information and the designation of the content as graded content by the instructor user; and generate a participation score for each of the one or more students according to the attributed participation credit based on the feedback information corresponding to the graded content designated by the instructor user.

16. The non-transitory computer-readable storage medium of claim 15, wherein the apparatus is further configured to execute the instructions to:

receive media from the one or more student users, wherein the participation score is generated based on the received media.

17. The non-transitory computer-readable storage medium of claim 15, wherein the apparatus is further configured to execute the instructions to:

update the feed; and dynamically generate a quiz based on the updated feed.

18. The non-transitory computer-readable storage medium of claim 15, wherein the apparatus is further configured to execute the instructions to:

initiate transmission of one of the participation scores to a device of a corresponding one of the one or more student users.

19. The non-transitory computer-readable storage medium of claim 15, wherein the apparatus is further configured to execute the instructions to:

generate a code for the classroom user group; and track attendance of the one or more student users based on the code.

20. The non-transitory computer-readable storage medium of claim 19, wherein the apparatus is further configured to execute the instructions to:

initiate transmission of the code to a device associated with the one or more student users;

receive a confirmation message from the device in response to the code, wherein the confirmation message indicates successful input of the code into the device; and generate a new code upon expiration of the code.

* * * * *